United States Patent
Farry et al.

(10) Patent No.: US 6,272,479 B1
(45) Date of Patent: Aug. 7, 2001

(54) METHOD OF EVOLVING CLASSIFIER PROGRAMS FOR SIGNAL PROCESSING AND CONTROL

(76) Inventors: Kristin Ann Farry, 513 Avondale La., Houston, TX (US) 77546; Julio Jaime Fernandez, 4110 Saint Michael's Ct., Suger Land, TX (US) 77479; Jeffrey Scott Graham, 9311 Tree Branch Dr., Houston, TX (US) 77064

(*) Notice: Subject to any disclaimer, the term of this patent is extended or adjusted under 35 U.S.C. 154(b) by 0 days.

(21) Appl. No.: 09/230,122
(22) PCT Filed: Jul. 21, 1998
(86) PCT No.: PCT/US98/14802
§ 371 Date: Jan. 22, 1999
§ 102(e) Date: Jan. 22, 1999
(87) PCT Pub. No.: WO99/04329
PCT Pub. Date: Jan. 28, 1999

Related U.S. Application Data
(60) Provisional application No. 60/053,295, filed on Jul. 21, 1997, and provisional application No. 60/054,593, filed on Aug. 1, 1997.

(51) Int. Cl.[7] .................................................. G06N 7/08
(52) U.S. Cl. ........................... 706/13; 706/14; 700/213; 700/250
(58) Field of Search ..................... 706/13, 14; 700/250, 700/213; 703/14; 713/600; 73/116

(56) References Cited

U.S. PATENT DOCUMENTS

| | | | |
|---|---|---|---|
| 5,136,686 | * | 8/1992 | Koza ....................................... 706/13 |
| 5,343,554 | * | 8/1994 | Koza et al. ............................. 706/13 |
| 5,390,282 | * | 2/1995 | Koza et al. ............................. 706/13 |
| 5,541,848 | * | 7/1996 | McCormack et al. ................ 700/213 |
| 5,587,524 | * | 12/1996 | Hampo et al. ............................ 73/116 |
| 5,642,467 | * | 6/1997 | Stover et al. .......................... 700/250 |
| 5,774,357 | * | 6/1998 | Hoffberg et al. ..................... 713/600 |
| 5,867,397 | * | 2/1999 | Koza et al. ............................. 703/14 |
| 6,058,385 | * | 5/2000 | Koza et al. ............................. 706/13 |

OTHER PUBLICATIONS

Andreas Geyer-Schulz; Holland classifier systems; Proceedings of the international conference on, Applied programming languages, Jun. 4–8, 1995, pp. 43–55.*

(List continued on next page.)

Primary Examiner—Mark R. Powell
Assistant Examiner—Wilber Starks
(74) Attorney, Agent, or Firm—Arthur M. Dula

(57) ABSTRACT

The present invention is a method of evolving classifier programs for signal processing and control. The present invention uses an 'evolver' program examine a large number of potential features, which may be from multiple signals to create a 'classifier' program. The output of the classifier program is compared to the desired output. One or more classifier programs is then created and optimized by the evolver program by means of genetic programming. The desired output is again compared to actual classifier program output and the difference is used as a measure of fitness to guide the evolution of the classifier program. The optimized classifier program produced by the present invention is fitter than the background art at correctly providing a repeatable and accurate output, especially for complex and simultaneous input signals. The classifier program may either operate within the program structure of the evolver program or it may be used as an independent program, as, for example, an individualized control program for the controller of a powered prosthesis.

8 Claims, 11 Drawing Sheets

OTHER PUBLICATIONS

Allan Rae and Sri Parameswaran; Application–specific heterogeneous multiprocessor synthesis using differential–evolution; Proceedings on 11th international symposium on System synthesis, Dec. 2–4, 1998, pp. 83–88.*

John R. Koza, Forest H. Bennett, Jeffrey L. Hutchings, Stephen L. Bade, Martin A. Keane and David Andre; Evolving computer programs using rapidly reconfigurable field–programmable gate arrays and genetic programming; Proceedings of the 1998 ACM/SIGDA sixt, Feb. 1998.*

Gary M. Gibson; A genetic algorithm for optimizing problems with multiple disparate data types; Proceedings of the 1995 ACM symposium on Applied computing, Feb. 26–28, 1995, pp. 300–304.*

* cited by examiner

METHOD OF EVOLVING CLASSIFIER PROGRAMS FOR SIGNAL PROCESSING AND CONTROL

RELATED APPLICATIONS

This application claims the filing date of U.S. Provisional patent applications Ser. No. 60/053,295, filed Jul. 21, 1997, and Ser. No. 60/054,593, filed Aug. 1, 1997, with respect to the inventions disclosed in the cited provisional applications.

TECHNICAL FIELD

The present invention relates generally to the automatic evolution of computer programs useful for signal processing and control. It is an evolver program that constructs a classification program. Specifically, the present invention relates to an adaptive method of evolving algorithms to select and combine useful signal features from complex simultaneous signals. Still more specifically the present invention relates to a method of evolving algorithms to map noisy or poorly understood natural signals to a useful output; for example, classifying myoelectric signals for the control of a prosthesis or classifying remotely sensed spectra for the identification of minerals.

BACKGROUND ART

The present invention's background art is generally found in the art of automatic pattern recognition. This art includes digital signal processing; neural networks and rule based expert systems. The present invention's background art also includes the creation and optimization of pattern recognition algorithms by means of evolutionary or genetic programming. The prior art specifically applicable to the best mode for carrying out the specific embodiments of invention is further found in the art of prosthesis control and the use of spectral analysis for the identification of minerals.

Pattern Recognition

As applied to the present invention, pattern recognition is the use of at least one input channel that carries data having multiple features to produce an output that has some utility. Usually the present invention will operate on multiple complex data channels that are simultaneous and may have features that are not well known or understood. The prior art teaches the use of digital signal processing, neural networks, and rule based artificial intelligence systems for pattern recognition.

Digital Signal Processing

Beginning in the late 1960's the general availability of inexpensive analog to digital converters and digital computers gave rise to digital signal processing (DSP). DSP taught the use of filters, sampling, z-transforms, system functions, FIR/IIR and FFT filters, windows, bilinear and band transformations, interpolation and decimation, polyphase filters. The present invention uses these well-known digital signal processing methods to make the digital signal easier to use.

A useful and comprehensive review of this prior art may be found in *The Digital Signal Processing Handbook* (Electrical Engineering Handbook Series) by Vijay K. Madisetti (Editor), Douglas B. Williams (Editor), Doug Williams (January 1998), CRC Press; ISBN: 0849385725

Digital signal processing can do simple pattern recognition, but the processing steps must be uniquely specified for each type of signal. This technology is useful mainly for echo supression and noise reduction in digital signals.

Neural Networks

In 1942 Norbert Weiner and his colleagues were formulating the ideas that were later christened 'Cybernetics', and which he defined as 'control and communication in the animal and the machine'. Central to this programme, as the description suggests, is the idea that biological mechanisms can be treated from an engineering and mathematical perspective. Of central importance here is the idea of feedback. With the rise of AI and cognitive science, the term 'Cybernetics' has become unfashionable in recent years it might be argued that, because of its interdisciplinary nature, the new-wave of connectionism should properly be called a branch of Cybernetics: certainly many of the early neural-net scientists would have described their activities in this way.

In the same year that Weiner was formulating Cybernetics, McCulloch and Pitts published the first formal treatment of artificial neural nets. The main result in this historic (but opaque) paper, as summarized in is that any well defined input-output relation can be implemented in a formal neural network.

One of the key attributes of nets is that they can learn from their experience in a training environment. In 1949, Donald Hebb indicated a mechanism whereby this may come about in real animal brains. Essentially, synaptic strengths change so as to reinforce any simultaneous correspondence of activity levels between the pre-synaptic and post-synaptic neurons. Translated into the language of artificial neural nets, the weight on an input should be augmented to reflect the correlation between the input and the unit's output. Learning schemes based on this 'Hebb rule' have always played a prominent role.

The next milestone is probably the invention of the Perceptron by Rosenblatt in 1957; much of the work with these is described in his book 'Principles of Neurodynamics'. One of the most significant results presented there was the proof that a simple training procedure, the perceptron training rule, would converge if a solution to the problem existed.

In 1969 enthusiasm for neural nets was dampened somewhat by the publication of Minsky and Papert's book 'Perceptrons'. Here, the authors show that there is an interesting class of problems (those that are not linearly separable) that single layer perceptron nets cannot solve, and they held out little hope for the training of multi-layer systems that might deal successfully with some of these. Minsky had clearly had a change of heart since 1951, when he and Dean Edmonds had built one of the first network-based learning machines. The fundamental obstacle to be overcome is the so-called 'credit assignment problem': in a multilayer system, how much does each unit (especially one not in the output layer) contribute to the error the net has made in processing the current training vector?

In spite of 'Perceptrons', much work continued in what was now an unfashionable area, living in the shadow of symbolic AI Grossberg was laying the foundations for his Adaptive Resonance Theory (ART). Fukushima was developing the cognitron; Kohonen was investigating nets that used topological feature maps, and Aleksander was building hardware implementations of the nets based on the n-tuple technique of Bledsoe and Browning.

In 1982 John Hopfield, then a physicist at Caltech, showed that a highly interconnected network of threshold logic units could be analyzed by considering it to be a physical dynamic system possessing an 'energy'. The process of associative recall, where the net is started in some initial random state and goes on to some stable final state, parallels the action of the system falling into a state of minimal energy.

This novel approach to the treatment of nets with feedback loops in their connection paths (recurrent nets), has proved very fruitful and has led to the involvement of the physics community, as the mathematics of these systems is very similar to that used in the Ising-spin model of magnetic phenomena in materials. In fact, something very close to the 'Hopfield model' had been introduced previously by Little, but here the emphasis was on this analogy with spin systems, rather than the energy-based description. Little also made extensive use of a quantum mechanical formalism, and this may have contributed to the paper's lack of impact.

A similar breakthrough occurred in connection with non-recurrent (feedforward) nets, when it was shown that the credit assignment problem had an exact solution. The resulting algorithm, 'Back error propagation' or simply back-propagation also has claim to multiple authorship, as noted by Grossberg. Thus it was discovered by Werbos resulting algorithm, 'Back error propagation' or simply backpropagation also has claim to multiple authorship, as noted by Grossberg. Thus it was discovered by Werbos rediscovered by Parker, and discovered again and made popular by Rumelhart, Hinton and Williams.

Aside from these technical advances in analysis, there is also a sense in which neural networks are just one example of a wider class of systems that the physical sciences have started to investigate which include cellular automata, fractals, and chaotic phenomena. Traditionally physics has sought to explain by supposing that there is some simple underlying global model, usually consisting of a differential equation, to which the real situation is supposed to approximate as a perturbation. Now some investigators are meeting the complexity of dynamical systems 'head on' as it were, and are supposing that any macroscopic ordering is an emergent property, arising from the action of a large number of simple stochastic elements acting in concert. Statistical physics represents the vanguard of this movement that now includes the areas noted above. Neural nets are also complex dynamical systems with emergent collective properties, as noted by Hopfield in the title of his original paper and it is not surprising, in hindsight, that the solid-state statistical physicists have managed to apply their theories to the subject.

Despite recent advances in the art of neural networks, they remain poor at processing multifeature, multichannel signals which are not linearly separable, such as the myoelectrical signals that used by the specific embodiment of the present invention used to control a prosthesis. This will be discussed below in connection with the background art on the best mode for using the present invention.

References in this part of the background art that may be useful to those skilled in the art to understand the present invention include:

*Neural Networks for Pattern Recognition* by Christopher M. Bishop, Paperback (November 1995), Oxford University Press; ISBN: 0198538642 (This book provides a solid statistical foundation for neural networks from a pattern recognition perspective.

*Pattern Recognition and Neural Networks* by Brian D. Ripley, N. L. Hjort (October 1995) Cambridge University Press; ISBN: 0521460867 (This book uses tools from statistical decision theory and computational learning theory to create a rigorous foundation for the theory of neural networks.)

The general problem not solved by the background art in pattern recognition is that the prior art cannot dependably produce a repeatable useful output unless the input signals are either simple or well understood. The prior art does not solve the problem of producing a reliable, repeatable output from multifeature simultaneous input signals.

Expert Systems

An expert system is a computer program that contains a large list of rules, obtained from an expert. The system chooses between these rules according to its programming. The present invention is not rule based and thus is not an expert system, although it may act like one.

Genetic Programming

Genetic programming is a type of programming that utilizes the same properties of natural selection found in biological evolution. John H. Holland (U.S. Pat. No. 4,697,242 for "Adaptive Computing System Capable of Learning and Discovery", which issued on Sep. 29, 1987) and John R. Koza (U.S. Pat. No. 4,935,877 for "Non-linear Genetic Algorithms for Solving Problems", which issued on Jun. 19, 1990) invented genetic programming. This background art is very general. Holland and Koza disclose methods for solving literally any problem.

The general idea behind genetic programming is to start with a collection of functions and randomly combine them into programs; then run the programs and see which gives the best results; keep the best ones (natural selection), mutate some of the others, and test the new generation; repeat this process until a clear best program emerges. A useful introduction to genetic programming may be found on the web page maintained by Jaime J. Fernandez, one of the present inventors, at www.geneticprogramming.com.

Tackett applied genetic programming to the problem of image discrimination of real world pictures [Tackett, W. "Recombination, Selection, and the Genetic Construction of Computer Prograns," PhD Dissertation, University of Southern California, 1994.] His problem consisted of bitmap pictures of resolution 512×640. Each of these pictures may or may not contain infrared views of military vehicles, which he calls "targets." Each individual target may occupy between 100 to 300 pixels. He had 1500 images containing multiple targets, for a total of 13,000 targets. His objective was to create a genetic program to look at an individual window of 62×62 pixels. The program would then give a binary yes or no answer to the question "Is there a target in this window?"

He proposed a genetic program consisting of a terminal set with twenty statistical features from the segmented images and a random floating-point variable. He then added a simple function set consisting of the four basic arithmetic operations, addition, subtraction, multiplication and division, and the function "If-Less-Than-Else". His fitness function was "if the result is greater than or equal to 0, then there is a target; otherwise, it is clutter" (non-target). In addition, a second measure of fitness was added: the a posteriori entropy of class distributions H (class/output) after observing the classifier output.

His runs consisted of a population of 500 possible solutions. After 60 generations he stopped his simulation. The program had a probability of detection of 75% and a probability of false alarm of 31%. He then compared his results to a neural network consisting of twenty input nodes and ten hidden nodes. The neural network also gave a similar result for the probability of detection: however, its probability of false alarm was 39%. Finally, he compared both results to a binary tree search. Again the binary gave the same results for the probability of detection, but its probability of false alarm was 61%. Thus, Tackett demonstrated the superiority of genetic programming over neural networks.

Laird and Saul from NASA Ames Research Center in Moffett Field California proposed a different method for using genetic programming to classify waveforms [Laird, P., and Saul, R. "Automated Feature Extraction for Supervised Learning," Proceedings of the 1994 IEEE World Congress on Computational Intelligence, IEEE Press, 1994.] Their problem consisted of classifying certain classes of events in telemetry data. Each of these data sets is a vector of sixty real numbers, which fall into ten different classes or signatures. Their solution consisted of using genetic programming to create features. They compared their genetic programming created results to features created using human intuition. The genetic program created a total of seven features, while five features were created manually. Both sets of features were then used as inputs for a back propagation neural network. The accuracy of both methods was about 98%. The advantage to the genetic programming approach is that no human need study the problem and laboriously extract the relevant data.

The following references will be useful to those skilled in the art who wish to better understand the present invention:

*Genetic Programming: On the Programming of Computers by Means of Natural Selection,* by John R. Koza (December 1992) MIT Press; ISBN: 0262111705

*Genetic Programming II: Automatic Discovery of Reusable Programs,* by John R. Koza (May 1994) MIT Press; ISBN: 0262111896

*Genetic Progamming: An Introduction: On the Automatic Evolution of Computer Programs and Its Applications,* by Wolfgang Banzhaf, Peter Nordin, Robert E. Keller, Frank D. Francone (January 1998) Morgan Kaufman Publishers; ISBN: 155860510X

*Adaptation in Natural and Artificial Systems: An Introductory Analysis With Applications to Biology, Control, and Artificial Intelligence,* by John H. Holland (June 1992) Bradford Books; ISBN: 0262581116

*Emergence: From Chaos to Order,* by John H. Holland (January 1998) Addison-Wesley; ISBN: 0201149435

Neither Holland nor Koza teach or suggest the use of a large number of potential signal features or a large number of signal functions in a function set to evaluate a digital signal or multiple simultaneous digital signals. The present invention uses genetic programming techniques to evaluate potential features and their combinations in what may be a complex and multi channel digital signal.

Prosthetics

All myoelectric control systems now commercially available are some small variation on the "envelope amplitude" philosophy. This kind of controller assumes the myoelectric is a high-frequency carrier that is amplitude-modulated by the muscle tension. The controlled decodes the signal in much the same way an AM radio decodes a broadcast signal. Recall that an AM signal is a very high frequency signal whose amplitude or "envelope" is a function of voice or music or some other information to be transmitted. An AM receiver picks the relatively low frequency voice or music off of the relatively high frequency carrier and throws away the carrier. It does this by rectifying (taking the absolute value of) the modulated carrier and then low-pass filtering (smoothing it so that only the low frequency modulating signal is left) it. Many myoelectric controllers take this one step further and compare it with a threshold, outputting a "motor on" signal when the envelope amplitude goes above the threshold and a "motor off" signal the rest of the time.

The following U.S. Patents are the best background art known to the inventors:

1. U.S. Pat. No. 3,491,378 "Artificial Arm Having Bioelectrically Controlled Finger Movement and Hand Rotation Responsive to Shoulder Muscle Impulses"

This USSR-developed arm and hand is a combination of mechanical rod-actuated and controlled ("body-powered") elbow and electric motor actuated myoelectrically controlled hand and wrist. This prosthesis is "multifunction" in the sense of having multiple joints or functions (ie, elbow, wrist rotations and grasp). The myoelectric control is called "proportional," but this is used only in the sense of being able to start or stop a motion at any position. There is no mention of proportional velocity or force control. The patent describes either 2 or 4 myoelectric electrode sites or control channels. Each of the myoelectric electrode sites is connected directly to a particular function.

For the 2 site system,
site 1: open grasp and wrist supination (turn palm up)
site 2: close grasp and wrist pronation (turn palm down), and
a "co-contraction" of the muscles under both sites switched the control from grasp to wrist. Note that this approach is still the most common control philosophy on the market.

For the 4 site system.
site 1: open grasp
site 2: close grasp
site 3: wrist supination
site 4: wrist pronation and simultaneous control of grasp and wrist was, in theory, possible if the user made the two appropriate contractions together. In practice, this was seldom achieved; hence, the relative popularity of the 2 site system. Note that the myoelectric control was an "envelope amplitude" system similar to the AM receiver, where the myoelectric signal used for control is rectified, filtered, and compared with a constant threshold, so that it turned on motors only when its envelope amplitude exceeded the threshold. At any time, a given electrode site was controlling only one motion.

2. U.S. Pat. No. 3,521,303 "Artificial Hand for Prostheses with Bioelectric Control"

This USSR-developed hand is a derivative of the original Soviet myoelectric (then called bioelectric) hand. This one has a thumb with two degrees of freedom, as well as independently driven fingers. "Pattern recognition" is never mentioned and the description of possible control methods suggests a simple look-up table approach to interpreting the (up to 4) muscle signals. There are no drawings of the myoelectric control portion of the hand. While the hand is capable of multiple motions or functions, the discussion on control implies that these can only be controlled one at a time. Other references in the literature on this hand say that its myoelectric control is envelope amplitude based.

3. U.S. Pat. No. 3,557,387 "Externally Powered Joint Prosthesis"

This is the first patent on what is now called the "Boston elbow," which is owned and produced by Liberty Technology (subsidiary of Liberty Mutual Insurance). The majority of this patent covers the elbow mechanism, but myoelectric control is mentioned and described in more detail than any previous patent. It also cites neuroelectric control as a possibility. The myoelectric control comes from electrodes located on the biceps and triceps muscle remnants (these muscles are major elbow movers in the intact arm). It is essentially an envelope amplitude control system, with three extras: (1) The envelope is derived from the difference between the two myoelectric inputs; (2) There is force and velocity feedback, making the elbow motion proportional to the difference between the inputs; and (3) There is a non-linear filter element that smoothes the fluctuations in the myoelectric signal's envelope by using a large time constant for small amplitude variations and a short time constant for large amplitude variations. Consequently, two electrode sites are mapped to two motions (elbow flex and elbow extend) or one joint.

4. U.S. Pat. No. 3,631,542 "Myoelectric Brace"

This is the earliest myoelectrically-control brace or orthosis patented. This brace adds grip and gripping strength to hands of people who have (usually due to spinal injury) lost grasp capability or have inadequate grasping strength for everyday living activities. It uses myoelectric control for a hydraulic actuator. The myoelectric controller is a very simple, envelope magnitude system controlling only grasp closing motion and force (Column 3, line 62 through Column 4, line 9, and Column 4, lines 16–21). There is only one electrode site, and its output is fed directly into the brace's single-function, squeezing fingers toward thumb.

5. U.S. Pat. No. 3,735,425 "Myoelectrically Controlled Prosthesis"

This patent teaches the use of a single myoelectric signal to open a normally closed hand when the controlling muscle is tensed. The control is proportional in the sense that the amplitude of the myoelectric signal's envelope (above a certain threshold) determines the size of the prosthetic hand's opening. There is position feedback of how far the fingers are open.

6. U.S. Pat. No. 3,822,418 "Electrically Driven Artificial Hand for Upper Extremity Prosthesis"

This is another USSR hand using myoelectric control. This one is an improved hand mechanism that allows finger-pinch, fist, lateral, and fist-lateral grasps with only two myoelectric control signals. It achieves the multiple grasp options with a two-mode thumb; however, the thumb mode is changed (from pinch and fist to lateral and fist-lateral grasps) with a mechanical switch which the user must bump on a table or other object. The open and close grasp is myoelectrically controlled with an envelope-amplitude system. One myoelectric signal opens the grasp and the other closes it, so a single electrode site maps to single motion system.

7. U.S. Pat. No. 3,883,900 "Bioelectrically Controlled Prosthetic Member"

This is another Boston elbow patent sponsored by Liberty Technology, it is an improved version of the one in U.S. Pat. No. 3,557,387. Most of the improvements are in the elbow mechanism. The control system improvements consist of modernizing the individual electronic component choices and adding a small deadband to improve rejection of 60 Hz interference.

8. U.S. Pat. No. 4,030,141 "Multi-Function Control System for an Artificial Upper-Extremity Prosthesis for Above-Elbow Amputees"

Even though it did not work very well, this is the first system to control multiple functions with a single electrode site, with no mode or function switching required. The inventor applied time series analysis to the raw myoelectric signal instead of using only the envelope amplitude. He used the results of this analysis—features called autoregressive (AR) parameters—as inputs to a decision or motion discriminating step where a motion choice was made. Thus, his control architecture is similar to the present invention in that he first computes certain features of the myoelectric signal, then he uses them to decide which motion to make. There is also a "training" mode, in which the controller must correlate the AR parameter values with particular desired motions, and an "operational" mode, in which the AR parameter values incoming are compared with the stored AR parameters correlated to particular motions and motion commands are issued.

The present invention's motion discriminating function evolution process is allowed to choose AR parameters as some of the options on a large menu of choices. The differences between the present invention's and this prior art are: (1) our controller is not restricted to using AR parameters, even though it is allowed to choose AR parameters and often does choose a few of them to use along with other parameters; (2) our motion discriminating process is not restricted to a particular form such as in this patent, but can evolve into a much different form; (3) our motion discriminating function can be different in structure for each user, not just different in the levels of input AR parameters; and (4) our motion discrimination function evolution is can be completely separated from the execution of the motion discrimination function.

9. U.S. Pat. No. 4,521,924 "Electrically Driven Artificial Arm"

This is the first patent on the "Utah Arm" developed by a team led by Steve Jacobsen of University of Utah. This patent mostly describes the elbow mechanism, showing it with a body-powered and shoulder-motion-controlled hook. It cites the potential for adding an electric wrist and hand but does not elaborate. The elbow has myoelectric control with 2 electrode sites, preferably placed over an agonist-antagonist pair such as the biceps and triceps. The system is an envelope-amplitude control system using the difference between the signals from the 2 sites, very similar to the Boston elbow scheme of U.S. Pat. No. 3,557,387, except for the non-linear filtering. In this arm, the non-linear filter is also adaptive—the time constant is a function of rate of change of the myoelectric signal. The patent also cites use of myoelectric signals for locking and unlocking the elbow. The co-contraction approach is used almost exclusively in the commercially available version of this arm for both the unlocking and switching control to wrist and hand. All "Utah" controllers (both in this patent and in further developments) map one myoelectzic site to one motion at any given time.

10. U.S. Pat. No. 4,623,354 "Myoelectrically Controlled Artificial Hand"

This patent teaches an electric hook combining "synergetic prehension" and "myopulse modulation" (see also U.S. Pat. No. 4,685,925, below). Even though this is a 1986 patent, one of the inventors (Childress) introduced both of these concepts circa 1973. This patent cites "significant, non-obvious" improvements to both, basically in the form of mechanisms and power consumption reduction. Synergetic prehension is a two-motor grasp driver where one motor does the high-speed open and close and a second motor adds grip force once an object is grasped. Myopulse modulation is a technique for driving a pulse-width-modulated motor with a stream of pulses derived by comparing the raw myoelectric signal (not its envelope magnitude) with a threshold and converting all peaks above the threshold into a motor-driving pulse. Each myoeiectric site drives one and only one function. It is not a multifunction system by any claim or stretch of the imagination. Hosmer Dorrance produces this hook, but interestingly, has not maintained the patent.

11. U.S. Pat. No. 4,685,925 "Voluntary Opening Prehension Device"

This patent is another that teaches a single myoelectric signal to open a "normally-closed" hand when the controlling muscle is tensed. This is a single site, single function controller which turns on an electric motor to open and hold open a hand until the user "releases it" or for a specified time. When the motor is not on, rubber bands force it closed. This myoelectric control system varies a little from the envelope amplitude systems. Called "myopulse modulations," the controller takes the raw myoelectric signal and compares it to a threshold. It passes everything above that threshold on to a pulse-driven motor controller. In the original myopulse modulation scheme (which one of these inventors, Dudley Childress, published 15 years prior to this patent), the resulting pulse stream (whose duty cycle and frequency increased with increasing muscle tension) drove a pulse-width-modulated motor directly. In this patent, some pulse filtering is added and the motor apparently drives to full open position whenever it receives a pulse.

12. U.S. Pat. No. 4,685,928 "Artificial Arm and Hand Assembly"

This is predominantly a mechanism patent, detailing the hardware design of an arm, but it briefly mentions both myoelectric and neuroelectric control. It particular, it cites nerve and muscle activity sensors made by the Viennatone Corporation as sources of motor drive signals, but it offers no detail on how. Control is one sensor site to one motion, judging from the detail on an alternate switch-controlled unit plugged into a household electrical outlet. Neither the muscle nor the neuroelectric control could have been implemented without some intermediate electronics for power amplification, etc.

13. U.S. Pat. No. 4,964,061 "Myoelectric Control Of Actuators"

Canadian patent covering myoelectric control of actuators in a robot, essentially "myoelectric teleoperation." The only signal processing that they cite is rectifying, integrating, and averaging a myoelectric signal and feeding this "myoelectric signal envelope" output directly into an actuator (Column 3, 17–24 and column 4, 45–50). It teaches the use of two myoelectric measurements for each actuator, one for each direction, and the two control signals "fight it out" to determine motion and stiffness of the actuator. This is essentially a myoelectric amplitude control philosophy. There is no mention of myoelectric pattern recognition, mapping of multiple myoelectric signals to one actuator response, or mapping of a single myoelectric signal to multiple actuators. The control system is not a multifunction myoelectric control system.

14. U.S. Pat. No. 5,062,857 "Myoelectrically Controlled Knee Joint Locking Device"

This is a prosthetic knee joint locking and unlocking device, hydraulic with myoelectric control. Column 2, lines 23–32 and 57 through column 3, line 52, describe a simple, single function myoelectric control of the lock whenever the myoelectric signal detected by a single pickup exceeds a certain threshold, another very simple myoelectric signal envelope magnitude system. There is no myoelectric pattern recognition of any sort. The myoelectric control is "intuitive" in the sense that loss of balance will result in tensing leg muscles reflexively, which will cause the control system to lock the knee in whatever position it happens to be in at that moment.

15. U.S. Pat. No. 5,336,269 "Method and Apparatus for Switching Degrees of Freedom in a Prosthetic Limb"

All multi-function prostheses in use today limit control to one joint or function at a time. For example, if you have an elbow and a wrist, you must first tell the prosthesis which joint (elbow or wrist) you want to move next, then tell it to move. In a myoelectric prosthesis, this "mode switching" is usually done by a "co-contraction" or simultaneous contraction of the control muscles (those under the electrode sites, usually two). The joint is moved by an isolated contraction of one of the control muscles. The co-contraction for mode switching is awkward and many people have trouble doing it reliably. This patent covers the best approach to date to mode switching. It allows the user to "train" the system (in a sense) by giving it ten to twenty mode-switching commands. The system records a time history of the signal envelope magnitudes from both myoelectric input channels. After "training," it stores an average time history and a maximum deviation. In "operation" mode, it compares the myoelectric time history from the myoelectric inputs to these stored parameters and makes a mode switching decision if the pattern matches the stored average to within the stored maximum deviation. This patent is relevant because it cites a "training" and an "operation" mode. It also mentions pattern recognition, although the scheme cited is very primitive and the patent "background" section specifically distinguishes this work from more sophisticated pattern recognition such as maximum correlation and neural networks. It can also recognize only a single pattern. The patent restricts itself to bipolar measurement techniques only and states that the preferred implementation is to use an agonist-antagonist muscle pair. It uses a time history of the magnitude, but specifically excludes other features of the signal. The patent mentions multifunction prosthesis control repeatedly, but defines it as the capability to switch from one mode to another and command that mode individually. No mention is made of the "phantom hand" and the patent outlines restrictions on what the user can select to train the mode switching system to recognize.

PCT Application Number 008599960, which seems to have been published, but never matured into a national patent, should be mentioned. This appears to be the PCT filed by Hugh Steeper of the UK on behalf of Bernard Hudgins and the University of New Brunswick of Canada for a true multifunction prosthesis control scheme using neural networks. It teaches the use of a very limited feature set, some of which are in the set of features used by the present invention; however the neural network in Hudgins' PCT application cannot select the best features of its feature set, but rather must use all of them. Thus, this prior art system cannot have the motion discrimination accuracy of the resent invention.

Mineral Identification

The conventional software now available to analyze mineral reflectance spectra includes tools that (1) compare the unknown measured spectra to a library of known spectra (by ratios or other comparisons) and (2) compute features or equivalent absorption models such as modified Gaussian. In general, the conventional software does not give a final identification of a mineral, but reduces the options to a level where a geologist can make a high-confidence choice. Where possible, geologists consult instrument measurements other than reflectance spectra to make a final decision on the mineral composition of a rock; however, reflectance spectra remains a powerful tool for remotely determining mineralogy. Recently, a number of researchers have applied neural networks to identifying the composition of solar system bodies.

Disclosure of the Invention

The present invention is a method of making programs for signal processing and control. The technical problem common to all the background art known to the present inventors is that no program or system provides a reliable and repeatable output when presented with an input signal or signals having features that are not well characterized or linearly separable or separable on a single feature. The present invention solves this problem by having an 'evolver' program examine a large number of potential features, which may be from multiple signals to create a 'classifier' program. The output of the classifier program is compared to the desired output. One or more classifier programs is then created and optimized by the evolver program by means of genetic programming. The desired output is again compared to actual classifier program output and the difference is used as a measure of fitness to guide the evolution of the classifier program. The optimized classifier program produced by the present invention is fitter than the background art at correctly providing a repeatable and accurate output, especially for complex and simultaneous input signals. The classifier program may either operate within the program structure of the evolver program or it may be used as an independent program, as, for example, an individualized control program for the controller of a powered prosthesis.

The best mode of the present invention disclosed below is generally useful to classify signals from sensors or data sets from instruments into meaningful categories, where the relationship between the signals and the classification categories is complex or unknown or both. It is also an object of the invention to provide a means to quickly and automatically tailor the classification process to any signal sources and classifications.

The industrial applicability of the present invention is shown through embodiments of the present invention used to produce programs to control a prosthetic hand from multiple myoelectric sensors on the patient's stump and to remotely identify minerals by analysis of sensed spectra.

BEST MODE FOR CARRYING OUT THE INVENTION

The primary object of the invention is to classify signals from sensors or data sets from instruments into meaningful categories, where the relationship between the signals and the classification categories is complex or unknown or both. It is also an object of the invention to provide a means to quickly and automatically tailor the classification process to any signal sources and classifications.

Figure 1:
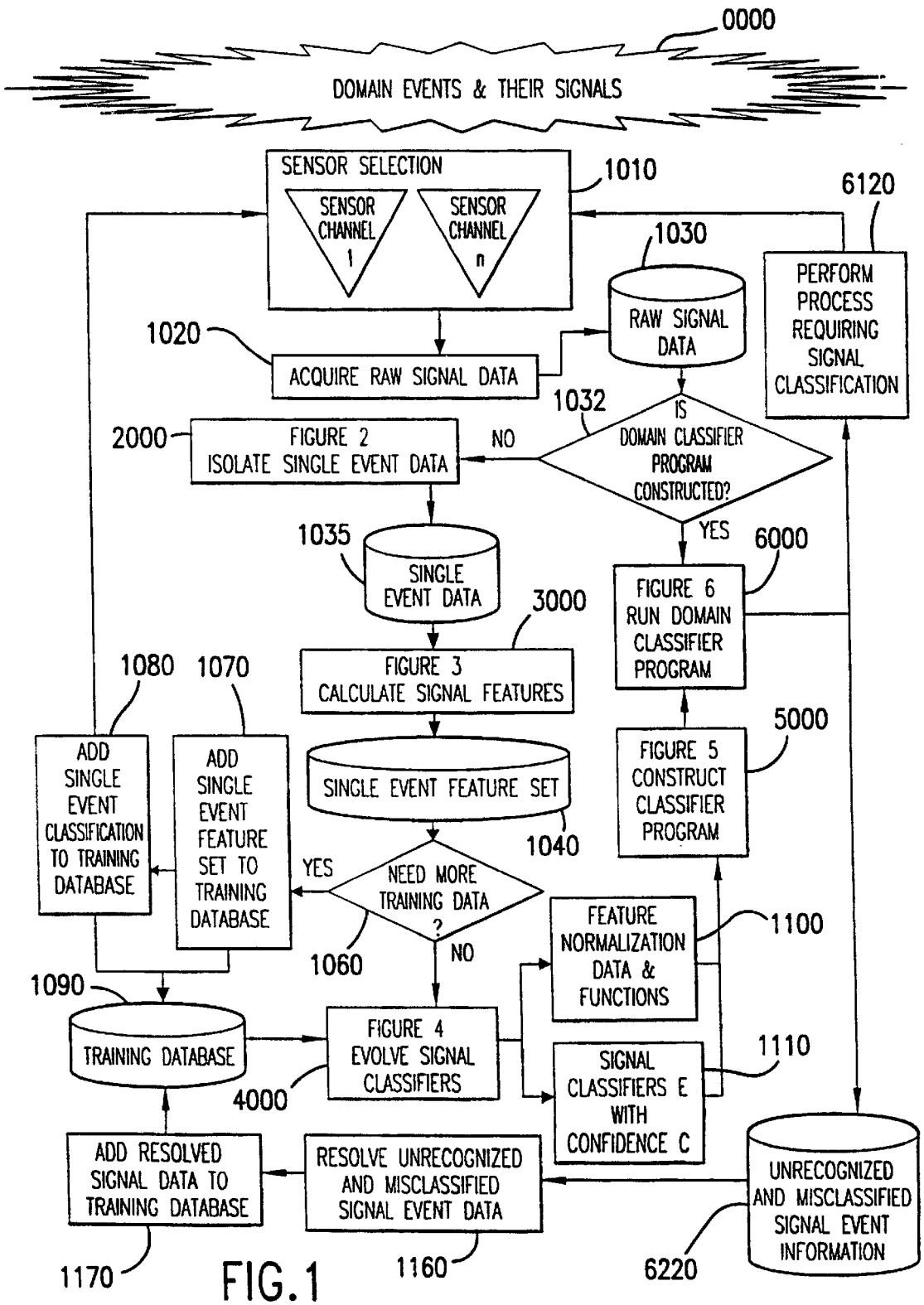
FIG. 1 is a flow diagram showing an overview of the operation of the general case of the evolver program taught by the present invention as it is used to create and optimize the classifier program of the present invention.

Explanation of FIG. 1—Overview of Process to Develop and Use the Signal Classifier system

0000 Domain Events and their Signals

The domain is the environment in which the signal classifier will operate. The domain may emit signals.

1010 Sensor Selection

Sensors appropriate for the domain are selected and actuated. Their quantity, quality and position determine the Signal-To-Noise ratio and the signal value itself. Sensors may be active or passive, and may perform some signal conditioning themselves.

1020 Acquire Raw Signal Data

Sense the domain environment using the selected sensors. Acquire and store/record the raw sensor data.

1030 Raw Signal Data

This is the raw signal data acquired from the domain environment.

1032 Is Domain Classifier Program Constructed?

If the domain classifier has been constructed and is running, then the raw signal data will be passed to it for classification. Otherwise the process is collecting data that will be used to evolve and construct the domain classifier system.

Figure 2:
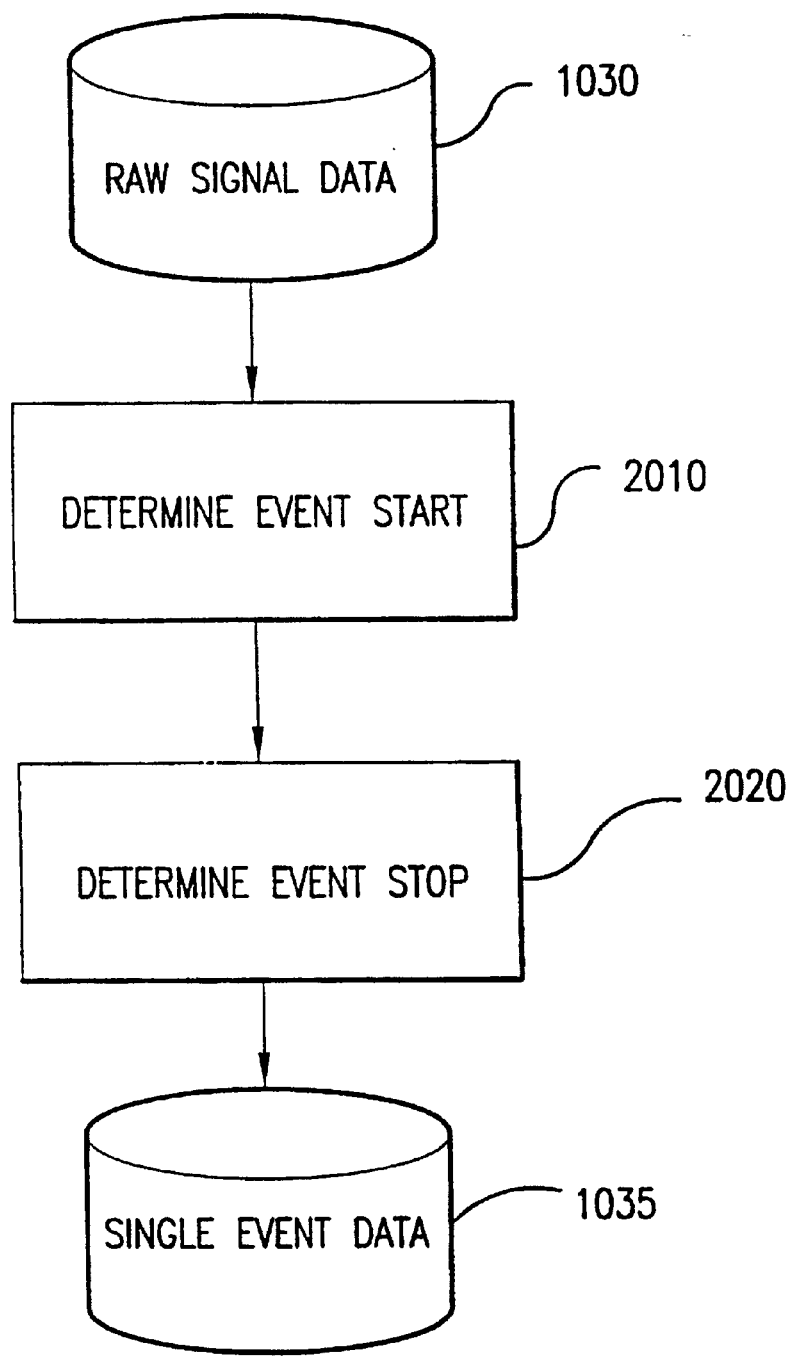
FIG. 2 is a flow diagram showing the detailed process to isolate single event data.

2000 FIG. 2 Isolate Single Event Data

1035 Single Event Data

The single event data is the raw signal data between the start and stop of the signal event.

Figure 3:
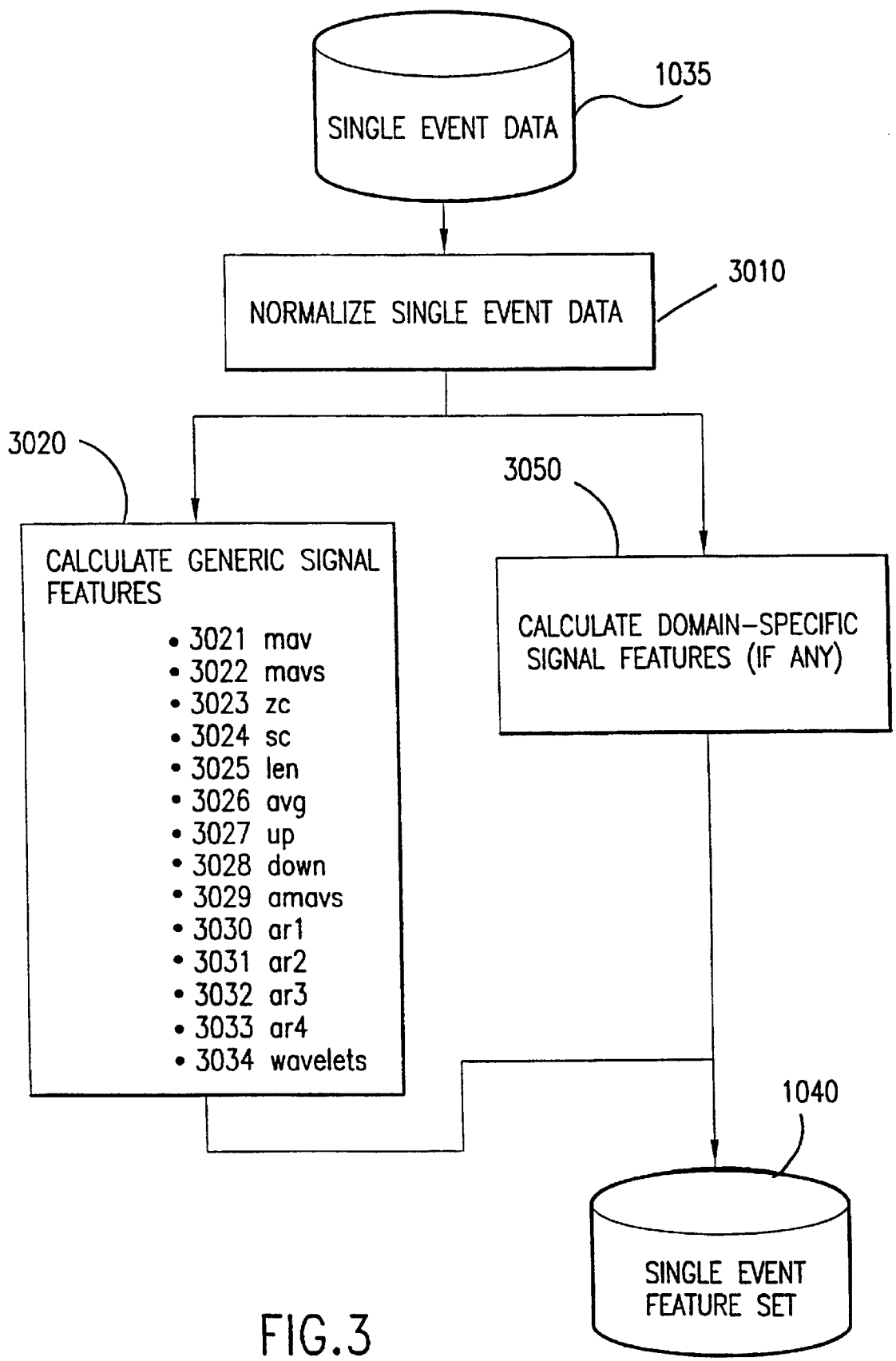
FIG. 3 is a flow diagram showing the process to calculate signal features.

3000 FIG. 3 Calculate Signal Features

1040 Single Event Feature Set

The single event feature set includes all features calculated for each sensor channel.

1060 Need More Training Data?

Failure of the GP process to converge to desired solution (s) may indicate a need for more training data.

1070 Add Single Event Feature Set to Training Database

In conjunction with #1080, add the new single event feature set to the training database.

1080 Add Single Event Classification to Training Database

In conjunction with #1070 above, add the classification for the single event feature set to the training database.

1090 Training Database

The training database consists of records, each of which contains one event classification and the features associated with that event.

Figure 4:
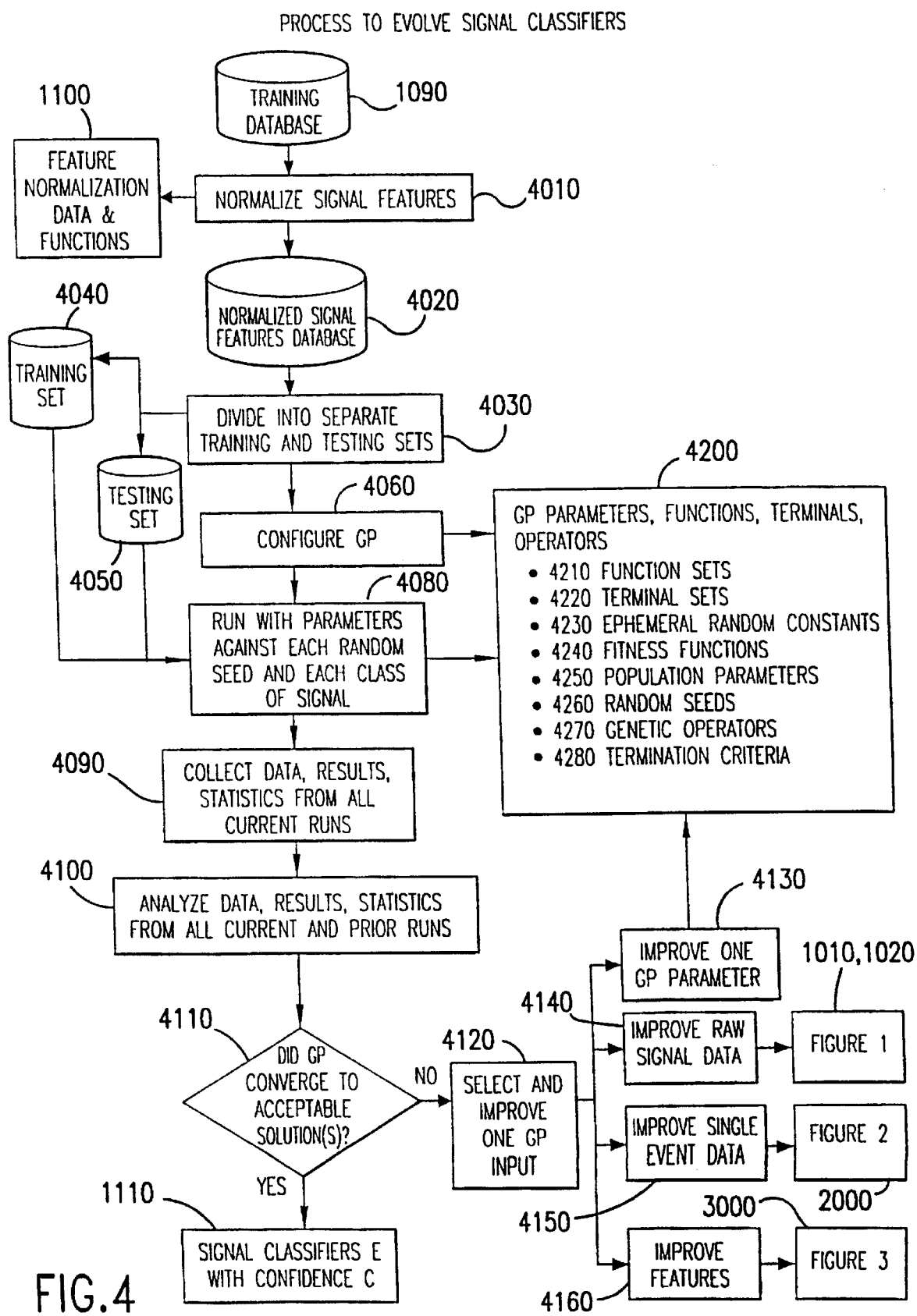
FIG. 4 is a flow diagram showing the process to evolve signal classifiers.

4000 FIG. 4 Evolve Signal Classifiers

1100 Feature Normalization Data and Functions

1110 Signal Classifiers E with Confidence C

This is the result of the GP evolutionary process; one classifier with known confidence. Confidence is calculated by evaluating a classifier against the testing database and establishing its accuracy.

Figure 5:
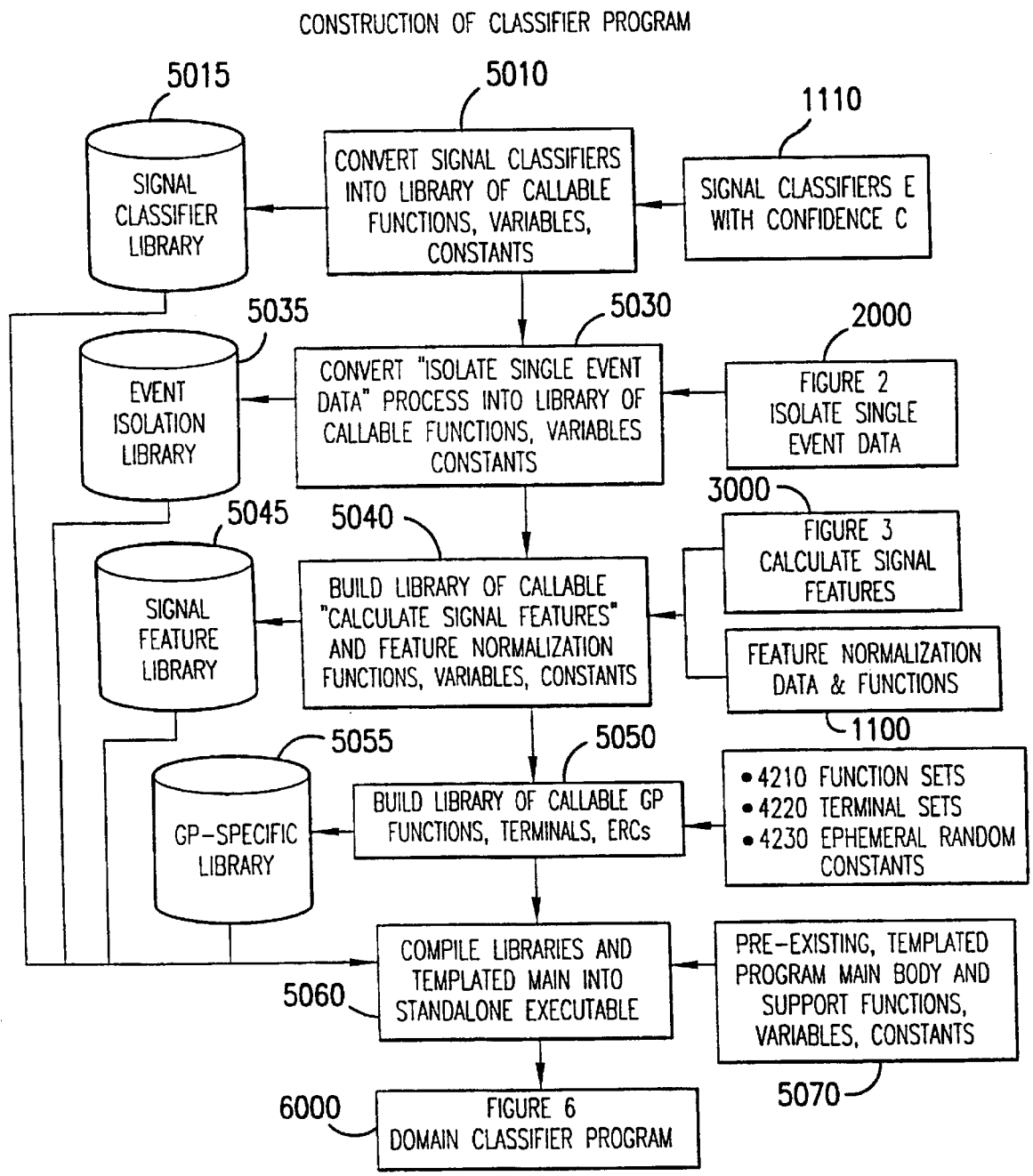
FIG. 5 is a flow diagram showing the process of construction of the classifier program.

5000 FIG. 5 Construct Classifier Program

Figure 6:
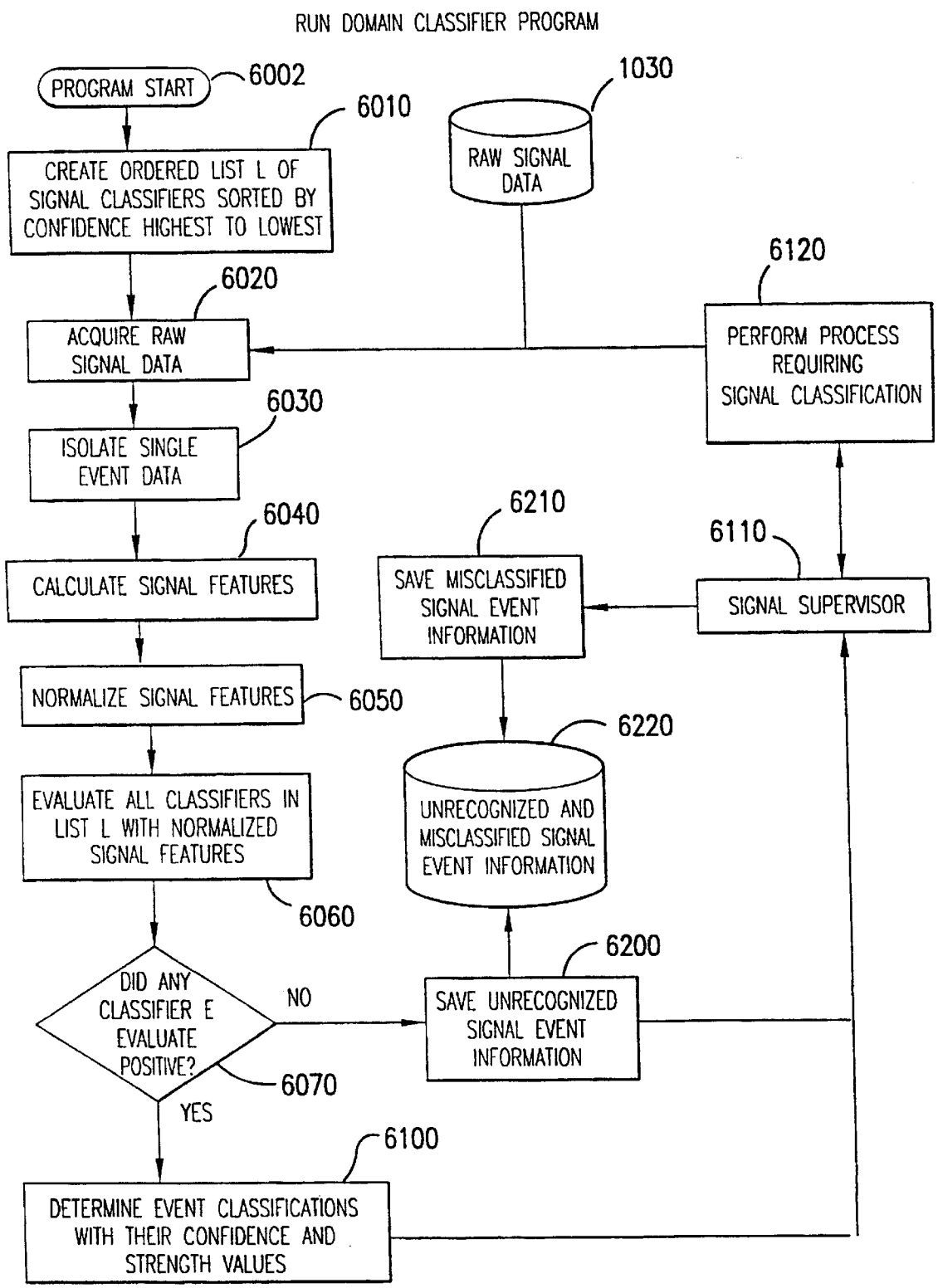
FIG. 6 is a flow diagram showing the operation, in independent mode, of the classifier program after it has been evolved and optimized by the evolver program of the present invention.

6000 FIG. 6 Run Domain Classifier Program

6220 Unrecognized and Misclassified Signal Event Information

1160 Resolve Unrecognized and Misclassified Signal Event Data

Programmatically, manually or otherwise resolve the unrecognized and misclassified signal event data to determine the proper classification.

1170 Add Resolved Signal Data to Training Database

Add the now-recognized signal event data to the training database for future refinement of the classifiers.

6120 Perform Process Requiring Signal Classification

Explanation of FIG. 2—Process to Isolate Single Event Data

2010 Determine Event Start

For domains where the process of determining the start of a single event from raw signal data is sufficiently simple and encapsulated in well-known equations (e.g., threshold crossing), this process involves a simple evaluation of those equations.

For domains where the single event is tied to external events (e.g. instrument scan start), the determination of the event start is simply the beginning of the raw single event data.

For domains where the single event start is complex or intertwined with the event classification, use the genetic programming process described in FIG. 4 to either:

1. evolve a program that identifies the event start (using appropriate GP parameters that may be different from those for evolving the signal classifiers) or
2. co-evolve the single event isolation program with the signal classifier programs The use of GP provides the benefit of a generic solution to the event start determination and may always be used.

2020 Determine Event Stop

See above discussion of #2010.

Explanation of FIG. 3—Process to Calculate Signal Features

3010 Normalize Single Event Data

The raw data is passed through domain-specific filters or transformations that affect amplitude, offset, phase and weight to enhance the signal-to-noise ratio and to produce values used in calculating the signal features.

3020 Calculate Generic Signal Features

Calculate features on the normalized single event data that are known to contribute generally to the solution of signal classification problems. One example of general/generic signal features is wavelets. This wide-ranging generic feature set is provided to the GP process in a form known as the "terminal set" in GP terminology. The GP process will determine, through the evolutionary process, which features are most appropiate for solving the classification problem for the chosen domain.

3034 Wavelets

Calcualte a library of bases (a fixed yet flexible set of bases consisting of wavelets and their relatives: wavelet packets, local trigonometric bases, and the autocorrelation functions of wavelets. The evolutionary process will determine the most appropriate features of the bases that contribute to solving the domain classification problem.

3050 Calculate Domain-specific Signal Features (if any)

These features contribute to the domain-specific solution of the classification problem.

Explanation of FIG. 4—Process to Evolve Signal Classifiers

4010 Normalize Signal Features

Each feature value for every signal event in the Training Database is normalized using $$F_{in} = (F_i - \bar{F})/F_\sigma$$

where $F_{in}$=normalized value for feature i of event $F_i$=original value for feature i of event $\bar{F}$=average value of feature i across all events $F_\sigma$=standard deviation of feature i across all events the formula

4020 Normalized Signal Features Database

This is the database of all normalized features for every signal event, including the event's classification.

4030 Divide Into Separate Training And Testing Sets

Randomly and evenly divide the #4020 database into separate training and testing sets, such that 1. each set contains events of all desired signal classifications
2. each set contains adequate numbers of events for each desired signal classification
3. the two sets are statistically equivalent and interchangeable.

4040 Training Set

The training set is that portion of the #4020 database selected for evolving the signal classifiers, i.e., measuring fitness and thus influencing the evolutionary process.

4050 Testing Set

The testing set is that portion of the #4020 database selected for use in determining how well the evolving signal classifiers perform against events unseen in the evolutionary process.

4060 Configure GP

Select values for items required for using GP. Initial values are often selected based on one's GP experience, knowledge and difficulty of the problem domain. Initial values are often determined by constraints on resources available to the GP process, including memory, disk space and raw computational power.

4210 Function Set(s)

The functions in the function set(s) must adhere to the principal of closure. This ensures that, during the evolutionary process, the functions will not cause the GP process to terminate abnormally due to range or domain errors in the functions. One function adhering to this principle is the "protected divide" function which returns a certain value in the exceptional case when divisor is zero or near zero. The function set consists of logical, mathematical and domain-specific functions.

Logical functions including if-greater-than-or-equal-to "ifge", if-less-than "iflt", and, or, not Purely mathematical functions including add, subtract, multiply, divide, square root, exponentiation, power, reciprocal, absolute value, floor, modulo, sign Mathematical Functions known useful to signals and their classification including sin, cosine, tangent, natural logarithm, base 10 logarithm

4220 Terminal Sets

The functions in the terminal set(s) are those that return values as leaves of the non-linear tree generally associated with individuals of a population in the GP process; they are functions that do not themselves call other functions from the function or terminal sets. Since we have sets of features, the following members of the function set are simply database lookups into the training or testing sets for the appropriate values:

MAV, MAVS, ZC, SC, LEN, AVG, UP, DOWN, AMAVS, AR1, AR2, AR3, AR4, Wavelets

4230 Ephemeral Random Constants

These features may include "magic numbers" known to contribute to the solution of the domain classification problem as well as numbers to help scale and/or skew values to the proper range.

4240 Fitness Function(s)

The initial fitness function for individual classifiers is defined to be:

$$F_i = \sum_{c=1}^{n} FalsePositve_c + FalseNegative_c$$

where $Fi$ = fitness of individual $i$ $n$ = number of training cases $$FalsePositive_c = \begin{cases} 1 \text{ if individual incorrectly recognized the signal} \\ 0 \text{ otherwise} \end{cases}$$

$$FalseNegative_c = \begin{cases} 1 \text{ if individual incorrectly did not recognize the signal} \\ 0 \text{ otherwise} \end{cases}$$

1. Population size
2. Maximum number of nodes per individual
3. Maximum depth per individual Population initialization parameters include 1. method for generating an individual (full, grow, half-and-half)
2. initial depth or depth range for individuals in the population
3. number of attempts to generate an individual in the population Parameters for sub-populations are defined. These parameters include the size limits and initialization parameters mentioned above, and parameters defining exchanges between sub-populations. Given sufficient computing resources, establish sub-populations that enable the evolutionary process to self-determine the best set of parameters, functions, terminals, operators, and other GP configuration information.

4260 Random Seeds

A list of 15 to 20 random seeds should be selected for use in the evolutionary process. Good candidates for these random seeds are the prime numbers.

4270 Genetic Operators

The genetic operators are chosen. The operators are crossover, reproduction and mutation. The operator selection methods include fitness-proportionate selection, over-selection, tournament selection, inverse fitness, random, best, worst, boltzman, and sigma.

4280 Termination Criteria

Termination criteria are those that indicate when the GP run should be ended. These criteria include: (1) the maximum number of generations for the GP process to run. This number may indicate that there is no maximum, i.e., continue until other termination criteria are met.

(2) the maximum number of unimproved generations for the GP process to run. If this maximum number of generation is reached without any improved fitness of the best individual of the run, then stop the GP process for this random seed.

4080 Run With Parameters Against Each Random Seed And Each Class of Signal

For each class of signal and each random seed, run GP until it finishes according to the termination criteria. Record data, results and statistics about each run separately. Given E signal classifications and R random seeds, there will be E*R runs for this set of parameters.

4090 Collect Data, Results, Statistics from All Current Runs

Results consist of the individuals with the highest fitness. There will be R best individuals for the E signal classifiers. Data on these results include counts of the terminals, functions, and Ephemeral Random Constants used and unused in the individuals of the population, as well as machine information including CPU time and memory used in the evolutionary process. Statistics include a breakdown of the individual's performance on the training and testing sets, categorized into raw quantities and percentages of true positives, true negatives, false positives, false negatives.

4100 Analyze Data, Results, Statistics From All Current and Prior Runs

Determine if GP converged to acceptable solutions(s) by considering the following questions:

1. Are the classifiers sufficiently accurate?
2. Are the classifiers of length, depth, or complexity suitable for real-time use in the target classifying machine?
3. Was the time to evolve the classifiers acceptable, i.e., was the processing power of the machine adequate?
4. Was the amount of machine memory adequate for the evolutionary process, i.e., was population size unrestricted?

Using prior run information, a sensitivity analysis of each changed GP parameter can be made. This analysis determines if the changes made positive or negative impacts on the quality of the evolved solutions. Changes in one parameter usually affect changes in another.

4110 Did GP Converge to Acceptable Solution(s)?

The analysis in #4100 answers this question. If GP did converge to acceptable solution(s), then the results are the set of classifiers E with their confidence values C.

4120 Select And Improve One GP Input

Based on the sensitivity analysis in #4100, select and improve one GP input, i.e., one aspect of the GP configuration that affects the quality of the solution(s). See #s 4130, 4140, 4150, 4160, 4200.

4130 Improve One GP Parameter

Among the many GP parameters one parameter must be altered. The alteration hierarchy is (1) change the population parameters; (2) change the genetic operators and their criteria; (3) remove, modify or replace members of the function set that rarely appear in fitter individuals and to add new members to the function set; and (4) Remove or replace ERCs that rarely appear in fitter individuals and add new ones. Note, however, that departing from this hierarchy does not change the overall invention.

4140 Improve Raw Signal Data

Failure to converge to desirable solution(s) may result from low quality raw data. Change the number, placement, and quality of input sensors #1010 to improve results. Change Hardware and software associated with capturing the raw signal data #1020 (e.g., filtering) and converting it into computer form #1030 (e.g., digitization) to improve results.

Improve Single Event Data

Failure to converge to desirable solution(s) may result from poor isolation of single event data. Improve the process used to isolate single event data. Additional data may also be required.

4160 Improve Features

The existing terminal set may be lacking needed functions. Remove, modify or replace features that rarely appear in fitter individuals. Add new features that expand the solution space that GP searches to include the desired solution.

4200 GP Parameters, Functions, Terminals, Operators

This is the information encapsulating all aspects of the GP configuration.

Explanation of FIG. 5—Construction of Classifier System

5010 Convert Signal Classifiers into Library of Callable Functions, Variables, Constants The signal classifiers are converted from their genetic program form into one appropriate for evaluation/execution by the embedded domain classifier program of FIG. 6 (e.g. convert prefix to infix notation).

5015 Signal Classifier Library

This is the library of callable signal classifier functions, variables, and constants.

5030 Convert "Isolate Single Event Data" Process Into Library of Callable Functions, Variables, Constants The process of isolating single event data is converted into embeddable form and made available to #5060.

5035 Event Isolation Library

This is the library of callable functions, variables and constants for isolating single events from raw signal data.

5040 Build Library of Callable "Calculate Signal Features" and "feature normalization" Functions, Variables, Constants The process of calculating and normalizing signal features is converted into embeddable form and made available to #5060.

5045 Signal Feature Library

This is the library of callable functions, variables and constants for calculating and normalizing signal features.

5050 Build Library of Callable GP Functions Terminals, ERCs

The GP Function Sets, Terminal Sets, and Ephemeral Random Constants are converted and made available to #5060. Members of the Function and Terminal Sets may require 1. conversion into more embeddable form
2. modifications to improve robust runtime behavior
3. modifications to improve runtime performance 5055 GP-specific Library This is the library of callable GP Functions, Terminals and ERCs.

5060 Compile Libraries and Templated Main into Standalone Executable

Convert the templated main into machine language, linked against the classifier libraries #5015, 5035, 5045, 5055 and required processor libraries.

5070 Pre-Existing, Templated "Main" Function And Support Functions, Variables, Constants The pre-existing, templated main function is the well-formed entry point of execution to the classifier program from the operating system of the CPU. These pre-existing software pieces are created/modified according to the specific use and/or needs of the classifier program.

Explanation of FIG. 6—Functionality of Domain Classifier System

6002 Program Start

Entry point for the embedded domain classifier system.

6010 Create Ordered List L of Signal Classifiers Sorted By Confidence Highest To Lowest Using an appropriate sorting algorithm, created an ordered list "L" of the evolved signal classifiers arranged such that the classifier with the highest confidence is first. This list also holds a boolean value for each classifier indicating its status of tried/untried. Note that not all evolved signal classifiers need be included on this list. It is possible that each evolved classifier may run as its own process on one or multiple CPUs.

6020 Acquire Raw Signal Data

Sense the domain environment using the selected sensors. Acquire and store/record the raw sensor data.

6030 Isolate Single Event Data

Determine the start and stop of the single event from the Taw signal data, thus determining its duration.

6040 Calculate Signal Features

Call the functions from the signal feature library to calculate the features from the single event.

6050 Normalize Signal Features

Call functions to normalize the signal features.

6060 Evaluate All Classifiers in List L with normalized signal features

Evaluate all classifiers in List L against the normalized signal features, calling its GP functions, terminals, ERCs, and other appropriate procedures, variables and constants.

6070 Did Any Classifier E Evaluate positive?

Each classifier is evolved to return a positive value (greater than zero) if it recognizes the signal. A zero or negative value indicates that the signal is not recognized by that classifier.

6100 Determine Event Classifications with their Confidence and Strength Values

Classifiers that evaluated positive are each analyzed using their confidence value C and strength value S.

Confidences are calculated using training and testing data in the evolutionary process FIG. 4. Strength values are calculated as a function of their evaluated positive values.

6200 Save Unrecognized Signal Event Information

Save/record the unrecognized signal event information so that it may be analyzed and otherwise recognized in #1160, then added #1170 to the Training Database #1090 for refined evolution leading to more accurate classifiers.

6210 Save Misclassified Signal Event Information

Save/record the misclassified signal event information so that it may be analyzed and otherwise recognized in #1160, then added #1170 to the Training Database #1090 for refined evolution leading to more accurate classifiers.

6220 Unrecognized and Misclassified Signal Event Information

This is a database of salient information about unrecognized or misclassified signal events, including raw signal data.

6110 Signal Supervisor

The signal supervisor mitigates circumstances associated with the signal, whether or not it was recognized. The supervisor is responsible for 1. breaking tie votes Should there exist multiple and mutually exclusive identified signals with similar confidence values, determine which classification is most appropriate, considering domain constraints, strength values, condition/state of the machine or its environment, and other salient data.

2. blending signals/transitioning between signals

In the case of non-exclusive signals (multiple signal events occurring simultaneously), determine their best presentation to #6120.

3. managing issues of concurrency

If each Classifier is running as its own process on a single or multiple CPUs, in parallel or serial fashion, the signal supervisor correctly manages issues related to concurrency (SISD, SIMD, MISD, MIMD).

4. determining any misclassification

Using the current state of the domain or other possibly eternal information, the signal supervisor may conclude that the signal has been misclassified.

6120 Perform Process Requiring Signal Classification

Act upon the signal reported by the signal supervisor.

Industrial Applicability

Prosthesis control and mineral identification—a brief discussion of the technical problem and its solution stating the advantages of the present invention over the background art; together with a detailed disclosure of the embodiment of the present invention.

One specific embodiment of the invention is control of artificial hands for amputees using bioelectric field variations in the amputee's residual limb. In the 1960s and 1970s, many prosthetic hands with finger, thumb, and wrist mobility were developed by researchers. The longest-running effort (1966–1979) was the Swedish Hand, which featured a two-axis (pronation/supination plus flexion/extension) wrist in addition to the conventional simple grasp. Its failure was very instructive and typical of all these attempts to produce a more capable prosthesis. Its problems included high weight, fragility, and large actuators (located in the forearm) which prevented its use by those with long forearms. Users cited difficulty of control as the worst problem, however. The user had to learn unnatural muscle contractions that required full concentration to control the arm. Fatigue quickly set in, distorting the signals and disabling the control system.

This experience convinced many in the prosthetics community that myoelectric control was fundamentally limited to simple actions such as opening and closing a single-axis gripper. Consequently, advances in mechanisms and reductions in the size of actuators have not resulted in new prosthetic hands, since advanced mechanisms are only marginally more useful than the current ones unless improved control is incorporated.

All myoelectric hands now commercially available are based on the assumption that the myoelectric signal is amplitude-modulated random noise. They use only one dimension of the myoelectric signal, its amplitude. These systems employ variations on the "tension" or "force estimating myoprocessor," where the term "myoprocessor" refers to the myoelectric signal processor. The common "two-site" grasp control system for a below elbow myoelectric prosthesis locates one measurement site (an electrode pair) over the wrist flexor remnants so that flexor tension signals the motor to close the hand. The other site is over wrist extensor muscle remnants so that extensor tension signals the motor to open it. Most people require extensive therapy time to learn to contract the flexors and extensors independently, since these muscles are differentially co-contracted in normal limb movement.

While most people can learn to make a pair of isolated contractions consistently, virtually no one can do more without full concentration. The Swedish Hand team, a Japanese (Waseda University) team, and a US (MIT and University of Utah) above-elbow team tried to find linearly-separable patterns in the combined output of many strategically located force estimating myoprocessors. None of these schemes overcome the limitations of the force estimator. The estimator cannot discriminate between forces applied by different muscles in the vicinity of the electrodes, requiring tedious positioning of the electrodes to minimize crosstalk. Furthermore, when electrode bipolar pair spacing is set to maximize selectivity to a single muscle, the electrodes can only sense signals from the most superficial muscles.

More is now known about how the brain recruits muscle motor units for a task and how their fiber characteristics shape the components of surface-measured myoelectric signals. Use of the myoelectric signal's spectrum in addition to its amplitude has led to multifunction selection performance improvements (around 80% correct) in laboratory tests. Unfortunately, myoelectric spectral characteristics vary from person to person. Also, an individual's myoelectric spectrum varies during the course of a movement. Many schemes using the myoelectric spectrum have been limited to performances of 80% or less because they did not account for these variations. Hudgins and his University of New Brunswick (UNB) colleagues broke the 90% barrier by exploiting these spectral variations for discriminating between biceps/triceps myoelectric signatures for arm motions in intact limbs (92% for elbow flex/extend, humeral rotation, and forearm pronation/supination). They used artificial neural networks (ANN) to adapt the approach to different people. Neural networks "learn" some aspects of an person's myoelectric patterns; their use began to address the differences between different individuals' patterns and variations in a single individual's patterns over time. Unfortunately, the UNB researchers were less successful with individuals with limb loss (averaging 86%).

The prosthesis control system taught by the present invention controls multiple motions (is multifunction), using one or more myoelectric signal measurements (electrode sites). The present invention uses either monopolar differential or bipolar signal measurement techniques. The user commands the prosthesis by moving his "phantom hand" through the desired motion or function. The present invention learns the muscle activity associated with a particular user's phantom hand motion. The user does not have to learn a particular isolated muscle contraction to move the hand a certain way. The present invention uses a wide range of features of the myoelectric signal, not just its envelope magnitude (a gross measure of muscle tension), and genetic programming to evolve a function discrimination or pattern recognition algorithm. There is no direct mapping between a particular electrode site and a particular motion or function controlled. Features from all myoelectric input electrodes can be used to determine any particular motion command output. This allows simultaneous joint motion or function control.

In the prosthetics control embodiment, the primary object of the present invention is to provide highly accurate and natural, easy-to-use control of multiple functions of a prosthetic limb, based on bioelectric signals from the user's residual limb. It is also the object of the prosthetics control embodiment to provide:

1. a means of control easily tailored to each individual user, which the user accesses by moving his or her "phantom hand" (an imaginary hand), thus eliminating the need for a user to train himself or herself to use the prosthesis.

2. a means to quickly and automatically tailor the controller to each individual user, and to periodically or continuously update this tailoring as the user changes over time.

3. user choice of the prosthetic functions to be controlled.

In the mineral identification embodiment, the primary object of the invention is to identify minerals from instrument data collected from minerals. It is also an object of the mineral identification embodiment of the present invention is to provide a means to quickly and automatically tailor the mineral identification to any instrument producing mineralogically significant data and any set of minerals.

Prosthesis Control

Figure 7:
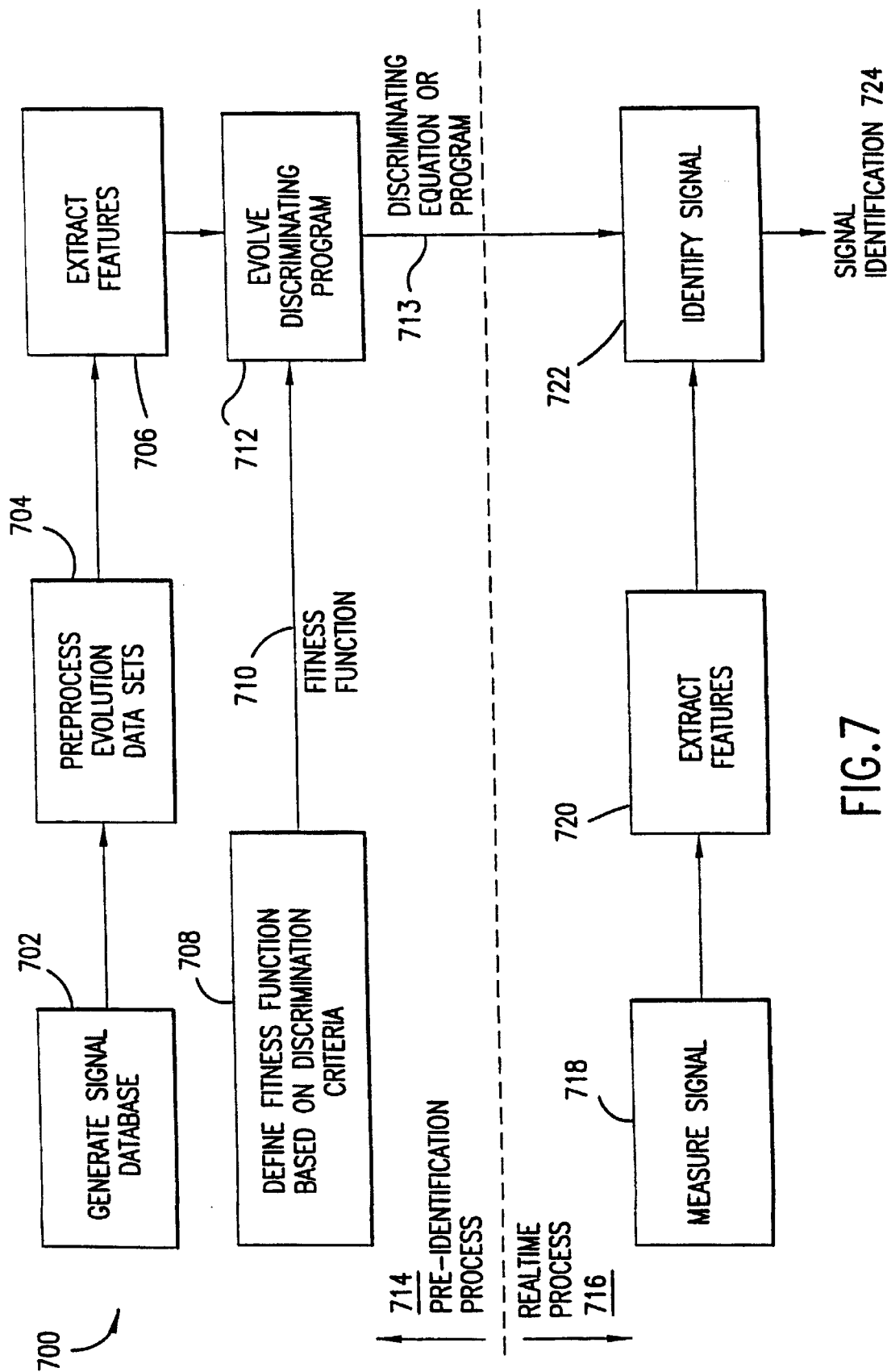
FIG. 7 is a flow diagram showing the general case of the operation of the present invention somewhat redrawn to provide a clearer description of the use of the present invention to create a myoelectric prosthesis control program to show the industrial applicability of the present invention.

FIG. 7 is a high-level flow-chart of the present invention presented in a manner that aids in understanding the following figures. The process 714 Pre-Identification Process, refers to the steps that must take place before the invention can be used to classify signals. The process starts with the step Generate Signal Database 702, which generates a database of signals for the invention to learn to identify. The step Preprocess Evolution Data Sets 704 converts the signal into a form similar (in terms of noise and other measurement factors) to the form that the invention will encounter in field use. Step 706, Extract Features, calculates features from each signal that potentially characterize its classification, containing information unique to the desired classification. Step 708, Define Fitness Function Based on Discrimination Criteria, produces a precise mathematical formula that calculates a value proportional to the signal classification success of candidate classifying programs. Output 710, Fitness Function, is this success-measuring function defined in step 708. Step 712. Evolve Discriminating Program, is the process by which the invention generates programs that can classify the signal set from step 702. Output 713, Discriminating Program, is the best signal classifier from step 712.

Real-time Process (716) consists of the signal classification steps that occur once the classification program or programs have been created in 714. Steps 716 classify new and unknown signals in real time field use. In step 718, Measure Signal, the process measures a new signal to be classified. The next step, Extract Features 720, calculates those features of the measured signal that the classifier program(s) need as inputs. In step 722, Identify Signal, the process uses the discriminating equation or program to classify the signal from step 718. Finally, output 724, Signal Identification, is the result of step 722.

Figure 8:
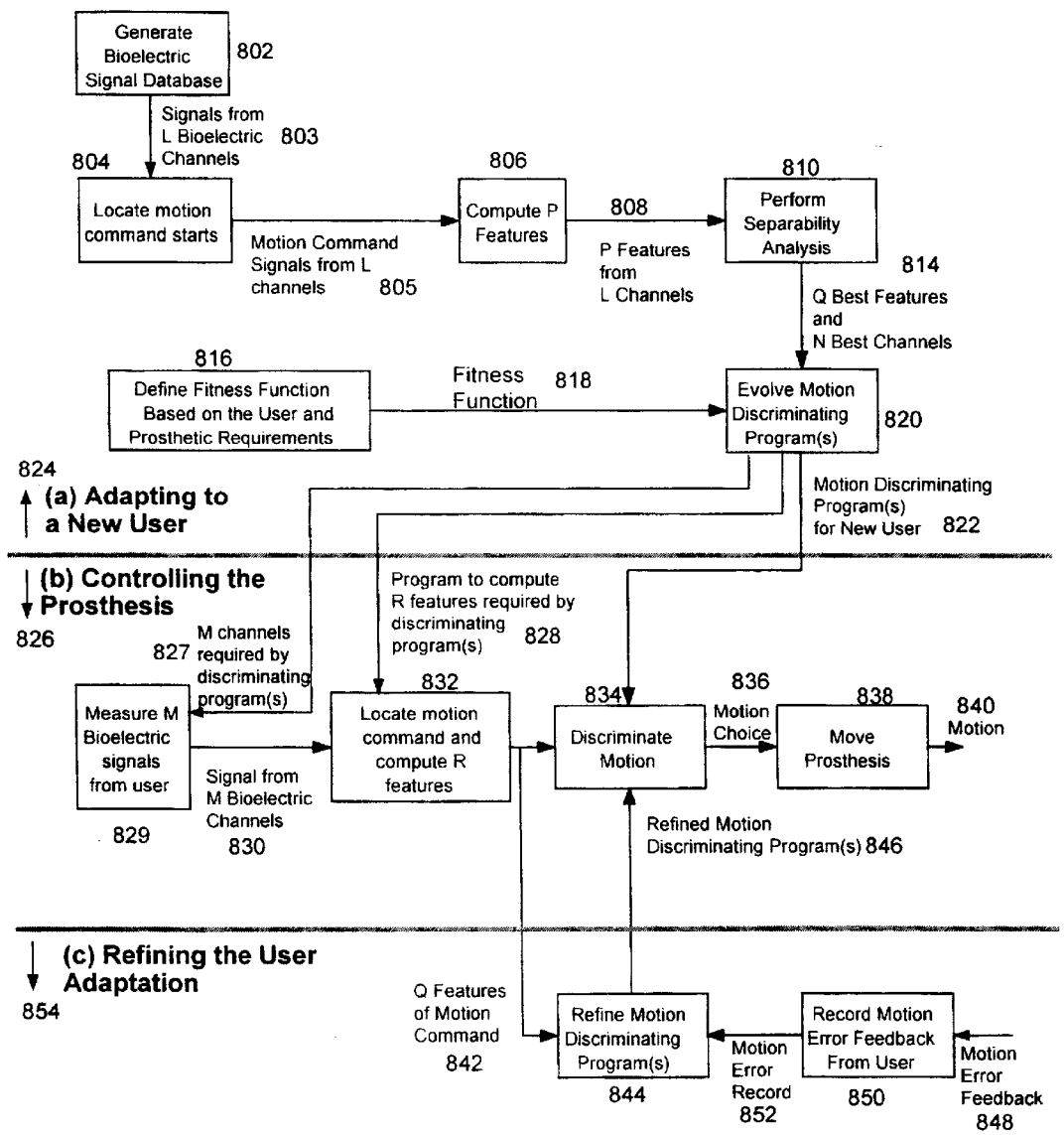
FIG. 8 is a flow diagram showing the operation of the present invention to produce a control program for a myoelectricly controlled powered prosthesis.

FIG. 8 shows the specific embodiment of the present invention useful for bioelectric or myoelectric control. This embodiment has three controller activities or modes: (a) Adapting to a new user; (b) controlling the device, and (c) refining the adaptation to the user.

(a) Adapting to a new user: This mode starts with the step Generate Bioelectric Signal Database, 802, collecting data from the new user to guide evolution of the control (in this embodiment it is motion discriminating) program.

Collecting data to guide evolution of the controller program requires L bioelectric sensors on (myoelectric case) or in (neuroelectric case) the controlling (residual) limb of the new user. The controller first measures and records L bioelectric signals from the L sensors on the user while the user commands each desired motion many times in any order, for a total of K motion trials. These K motion trial records form a database of known motion commands versus the bioelectric signals resulting from the motion commands. The controller then (step 805) assists an operator in finding the command starting time in each trial (manual assist option for motion command start selection) by presenting the operator with plots of the signals for each motion alongside superimposed on plots of certain signal features including, but not limited to:

(1) Mean absolute value (MAV) of a time interval of one or more signals;

(2) Signal energy in a time interval of one or more signals;

(3) Rate of change of energy from one time interval to the next of one or more signals; or (4) A combination of the above.

The controller also estimates the motion command starting time in each trial based on heuristics such the above signal features (MAV, rate of change of MAV, energy, and rate of change of energy) exceeding thresholds that experience with many users show are effective indicators of motion start. The operator can then either accept the controller's estimate of the motion command start or select another. Note that the operator can request that the controller by-pass the operator review and selection and accept the controller's estimate for all motion command starts (automatic option for motion command start selection).

Next (step 806), for each recorded motion trial, the controller reduces the L bioelectric signals in a time interval or intervals close to and including the motion command start down to a "feature set." The length and number of the time intervals are variables depending on the motions involved. This reduced order (P) representation of the bioelectric signals or feature set includes, but is not limited to:

(1) Mean absolute value (MAV)

(2) MAV slope between time intervals;

(3) Energy;

(4) Rate of change of energy;

(5) Average value;

(6) Number of zero crossings;

(7) Number of up slopes;

(8) Number of down slopes;

(9) Waveform complexity;

(10) Mean frequency;

(11) Median frequency;

(12) Energy or power at any frequency;

(13) Variance;

(14) Autoregressive or autoregressive moving average parameters; and

(15) Any ratios or other combinations of the above both within or between channels or time intervals.

In the preferred embodiment, the controller then performs a separability analysis (step 810) to choose the subset of N ($N \leq L$) bioelectric channels and Q ($Q \leq P$) features that will yield the best discrimination of the commands that the user generates. This separability analysis consists of:

(1) listing all possible pairs of motions that the controller must discriminate between;

(2) computing, for each pair, a "normalized separation distance" equal to the difference between a each feature's averages on each channel for both members of the motion pair divided by half the sum of the feature's standard deviations on that channel;

(3) averaging the normalized separation distances across all pairs of motions for a given channel and feature;

(4) ranking the channels and features by these pair-based average separation distances; and (5) choosing the N channels and Q features with the highest average separation distances, which will offer the best discrimination performance.

In a variation on the preferred embodiment, one can base the choices of the best N channels and Q features on averages of the normalized separation distances across channels or features rather than across all motion pairs. In another variation, one can use a technique other than normalized pair-wise separation distances to measure separability. In yet another variation on the preferred embodiment, one can delete the separability analysis altogether, using all L channels and P features for the next stage (ie, set N=L and Q=P).

Next, after the separability analysis, the controller evolves a motion discriminating program (step 820). It uses the N channels and Q features predicted to offer the best performance plus a set of operations (including, but not limited to, arithmetic and trigonometric functions) and a fitness or performance evaluation function defined in step 816.

An alternative embodiment of the prosthetics controller, evolving the motion discriminating function (step 220) required the following steps.

1. Isolate (or select) the 200 ms of the signal immediately following the motion command's start.
2. Calculates the following features for each channel of each signal:
   (1) Mean absolute value . . . MAV
   (2) MAV slope between time intervals . . . MAVS
   (3) Average value . . . AVG
   (4) Number of zero crossings . . . ZC
   (5) Number of up slopes . . . UP
   (6) Number of down slopes . . . DOWN
   (7) Waveform Length . . . LEN
   (8) Slope Changes . . . SC
   (9) Any ratios or other combinations of the above both within or between channels or time intervals.
3. Select a series of functions to be used. In this example the following functions were used:
   (1) Addition . . . +
   (2) Subtraction . . . −
   (3) Multiplication . . . *
   (4) Division . . . /
   (5) Square Root . . . sqrt(abs(x))
   (6) Sine . . . sin
   (7) Cosine . . . cos
   (8) Tangent . . . tan
   (9) Natural Logarithm . . . ln(abs(x))
   (10) Common Logarithm . . . log(abs(x))
   (11) Exponential . . . exp
   (12) Power Function . . . x^y
   (13) Reciprocal . . . 1/x
   (14) Absolute Value . . . abs
   (15) Integer or Truncate . . . int
   (16) Sign . . . sign Randomly select some variables which represents the features and some functions, put them together to form equations. An example of an equation is:

$$\ln((\text{MAV channel 1}) + (\text{ZC channel 2}))$$

4. Take the features from the signals that will be used for training from each of the motions. In this example 20 signals were selected from 3 motions, for a total of 60 signals. Insert those features into the variables. For example the value for MAV of channel 1 is replaced with the variable (MAV channel 1).

5. Execute the equations to obtain a result for each type of motion. In this example since 60 different signals are used 60 results are obtained.
6. The equations that produce a single number greater than 16 million are deleted and replaced by a new randomly created equation.
7. Use the results from #6 to obtain the standard deviation from each of the motions. In this example 3 motions are used, which yield 3 different standard deviations.
8. Use the results from #6 to obtain the difference between the average value from each of the three motions. For example, if the average value of motion #1 is 0, and the average value of motion #2 is 10, and the average value of motion #3 is −50. Then the difference between #1 & #2 is 10, between #1 & #3 is 50, and between #2 & #3 is 60
9. Add the three results from #8.
10. Take the smallest value from #9 and obtain its reciprocal and multiply by a weight.

In this example the smallest value is 10. Its reciprocal ($\frac{1}{10}$) is 0.1. It is then multiplied by 100 to yield 10. This formula converts the smallest difference value into a small number.

12. Add the result from #11 to #12. The best equation is defined as the one with the smallest value. The best equation is the one that has the smallest standard deviation for each type of motion. And, the equation that has the greatest difference between the average results for each type of motion. Thus, the objective is to converge the average values for each of the signals of the same type of motion and to separate the average values from the different motions.
13. Sort the equations using the values obtain in step #12 from smallest to largest.
14. Use the sorted list of equations to create the next generation of equations, using the following 4 steps:
   (1) Take the best eighth (12.5%) of the equations and copy them to the next generation.
   (2) The first method applies the crossover operation to the first quarter (25%). The parents selected for the first operation are the best two equations, from which two new solutions are formed. The first method performs the crossover operation on the next pair, and this process continues with all the equations of the first quarter.
   (3) The second method applies the crossover operation on another copy of the best quarter (25%) from the previous generation. However, the selection method is different than the previously described method. It takes the best equation of the best quarter and crosses it with the worst equation of the best quarter. Afterwards, it crosses the second best equation with the second worst equation, this process continues with all the solutions from the quarter.
   (4) It mutates the best three eighths (37.5%) of the population.
15. Go back to #6 and repeat until either a certain number of times (usually 10,000) or until the best equation has arrived at a satisfactory result. A satisfactory result is a result where none of the result of the signals is within the standard deviation of another motion.
16. The equation obtained from #15 is designated as the final result.
17. Take the features obtained from the unused signals. Insert these features through the final equation and obtain the results as described in #8 through #12.
18. If the final equation does not produce a satisfactory result go back to #4 and repeat again.

Figure 9:
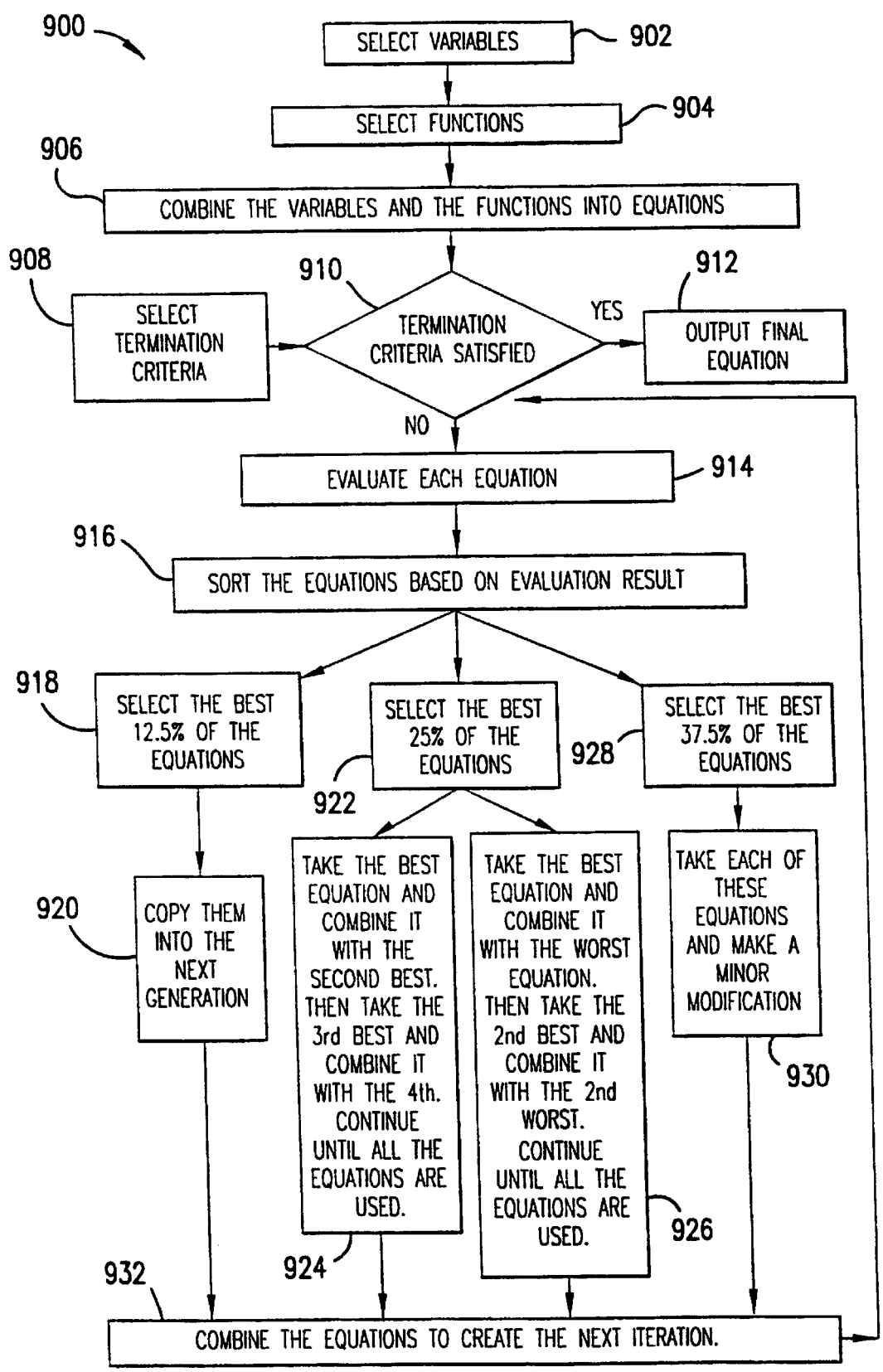
FIG. 9 is a flow diagram showing the steps for an alternate embodiment of the evolver program taught by the present invention.

FIG. 9 is a flow chart showing the process of evolving the motion discriminating program in this alternate embodiment of the prosthesis controller. The process 900 starts with step 902, Select Variables, selecting the features that will be used in the process. The step 904, Select Functions, determines which functions will be used in the process. At step 906, Combine the variables and the functions into equations, the process randomly creates a number of programs. Step 908. Select Termination Criteria, determines the rules that will be used to terminate the process. If the termination criteria for the process (910) is satisfied, the process terminates at step 912, Output final program. For example, termination criteria can be finding an equation that correctly identifies the signals, or by achieving a certain degree of improvement. The basic iterative loop of the process begins with step 914, evaluate each program. Step 916, Sort the programs based on evaluation result, arranges the programs in order from best motion discriminator to worst motion discriminator. Step 918 selects the best 12.5% of the programs and takes the top 12.5% of the programs based on their fitness. The selected programs are copied into the next generation in step 920. Step 922, Select the Best 25% of the programs, takes the top quarter of all the programs based on their fitness. In step 924, the process uses a formula to combine the programs to form new programs. The formula consists of taking the top program and the second best program and crossing them together to form new programs. The process then takes the third best program and the fourth best program and crosses them to form two new programs. The process continues until all the programs in the quarter are used. Step 926 uses a similar procedure to step 924. Step 926 takes the top program and the worst program from the top quarter, it then crosses them to form two new programs. It then takes the second best program and the second worst program and crosses them to form two new programs. The process is continued until all the programs in the top quarter are used. Step 928, Select the Best 37.5% of the Programs, takes the best 37.5% of the programs. Step 930 selects those programs and modifies them. One possible modification is changing a function for a different function. For example, a multiply function can be changed for an addition function. Another possible modification is to change a variable for a different variable. For example, a variable Zero Crossings can be changed to the variable Mean Absolute Value. Another possible modification is replacing a section of the program with a new section. For example, the section (ZC+MAV) can be changed for Log(Len). The possible modifications are not limited to these, however. After modification, the new programs are inserted into the next generation 932 and the process returns to consider the termination criteria 910.

Figure 10:
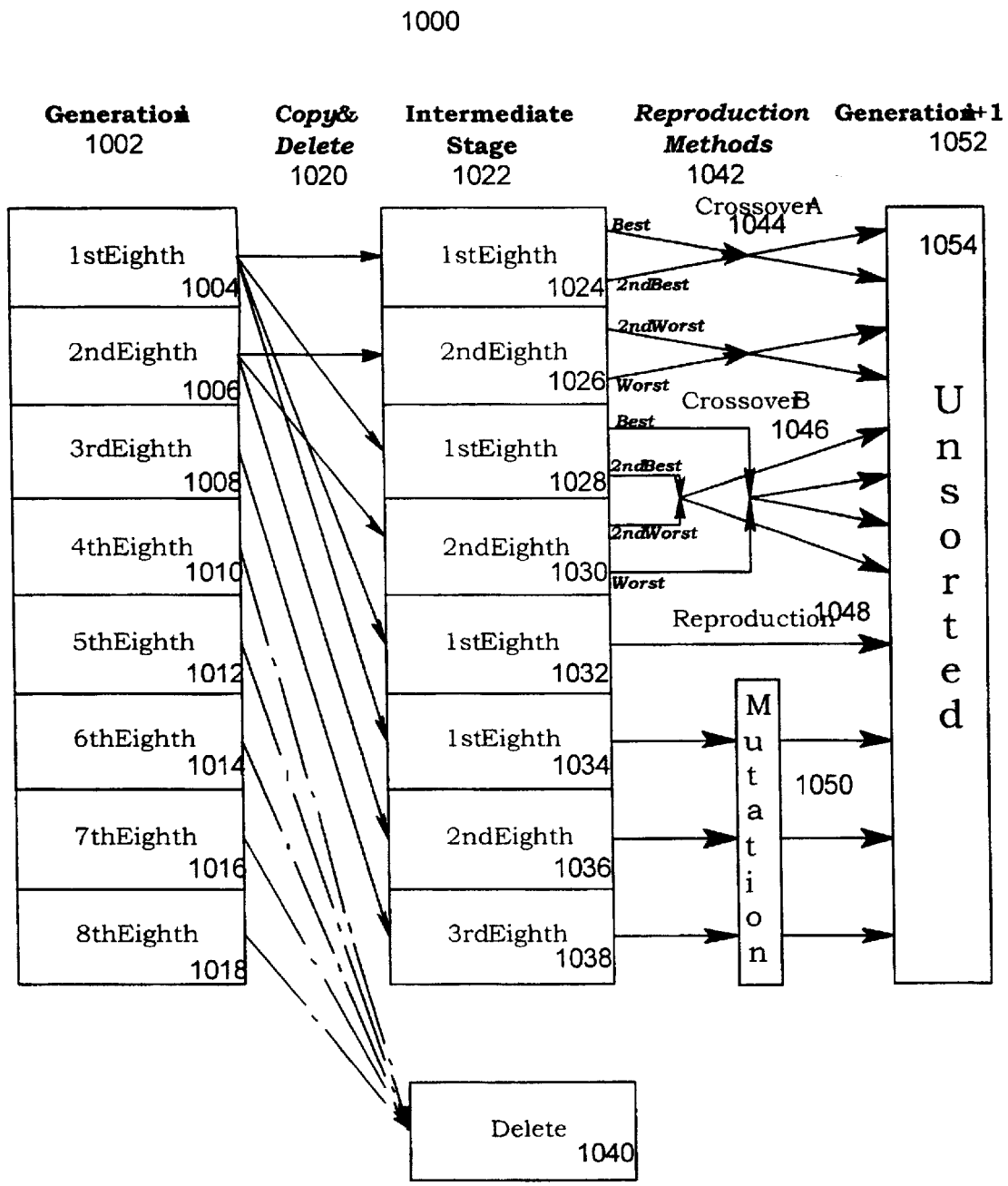
FIG. 10 is a flow diagram showing the steps of the selection process for the evolution of the classifier program for the alternate embodiment of the present invention shown in FIG. 9.

FIG. 10 is a flow chart showing more detail the program modification portion of the alternative embodiment. The process 1000 starts by the step 1002 of using a using a Generation, which in this process is called Generation i. The process assumes that the population of programs are sorted according to their value from the fitness function (a measure of their motion discriminating potential). The best program is the top program and the worst program is the bottom program. Steps 1004 through 1018 represent the population divided in eight eighths. The $1^{st}$ Eighth 1004 represents the top 12.5% of the programs. The $2^{nd}$ Eighth 1006 represents the second top 12.5% of the programs. The $3^{rd}$ Eighth 1008 represents the third top 12.5% of the programs. The $4^{th}$ Eighth 1010 represents the fourth top 12.5% of the programs. The $5^{th}$ Eighth 1012 represents the fifth top 12.5% of the programs. The $6^{th}$ Eighth 1014 represents the sixth top 12.5% of the programs. The $7^{th}$ Eighth 1016 represents the sixth top 12.5% of the programs, in other words the second bottom 12.5% of the programs. The $8^{th}$ Eighth 1018 represents the eighth top 12.5% of the programs, in other words the bottom 12.5% of the programs. Step 810, Copy & Delete, does the necessary copying and deletion to create an intermediate stage, which is described in steps 1022 through 1040.

Step 1022, Intermediate Stage, is the step in the process in which many of the programs are copied and the rest are deleted. Step 1024. $1^{st}$ Eighth, is a copy of the $1^{st}$ eighth from the present generation into the intermediate stage. Step 1022, $2^{nd}$ Eighth, is a copy of the $2^{nd}$ eighth from the present generation into the intermediate stage. Step 1028, $1^{st}$ Eighth, is another copy of the $1^{st}$ eighth from the present generation into the intermediate stage. Step 1030, $2^{nd}$ Eighth, is another copy of the $2^{nd}$ eighth from the present generation into the intermediate stage. Step 1032, $1^{st}$ Eighth, is a third copy of the $1^{st}$ eighth from the present generation into the intermediate stage. Step 1034, $1^{st}$ Eighth, is a fourth copy of the $1^{st}$ eighth from the present generation into the intermediate stage. Step 1036, $2^{nd}$ Eighth, is third copy of the $2^{nd}$ eighth from the present generation into the intermediate stage. Step 1038, $3^{rd}$ Eighth, is a copy of the $3^{rd}$ eighth from the present generation into the intermediate stage. Step 1040, Delete, represents the deleted $4^{th}$, $5^{th}$, $6^{th}$, $7^{th}$, and $8^{th}$ eighths from the present generation. In summary, the $1^{st}$ eighth is copies four times, the $2^{nd}$ eighth is copies three times and the $3^{rd}$ eighth is copied once into the intermediate stage. All other eighths are deleted.

Step 1042, Reproduction Methods, illustrates the different reproduction methods used in this invention. However, the invention is not limited to these methods, and some of the methods are optional to the invention. Step 1044, Crossover A, illustrates the first type of crossover method. In this method the best program and the $2^{nd}$ best program from the top two eighths are crossed to form two new programs. The $3^{rd}$ best program and the eh best program from the top two eighths are crossed to form two new programs. The process continues until all the programs are selected in the top two eighths. In the last crossing the process selects the $2^{nd}$ worst program and the worst program from the top two eighths to form two new programs.

Step 1046, Crossover B, illustrates the second type of crossover method. In this method the best program and the worst program from the top two eighths are crossed to form two new programs. The $2^{nd}$ best program and the $2^{nd}$ worst program from the top two eighths are crossed to form two new programs. The process continues until all the programs are selected in the top two eighths.

Step 1048, Reproduction, copies the best eighth into the next generation. Step 1050, Mutation, modifies the top three eighths into the next generation. The modifications can be one of several types, but is not limited to the following modifications: A modification would be to change a finction for a different function. For example, a multiply finction would be changed for an addition function. Another modification would be to change a variable for a different variable. For example, in the myoelectric signal identification process a variable of Zero Crossings, would be changed for a variable or Mean Absolute Value. Another type of modification would be to change a section of the program for a new section. For example in the myoelectric signal identification process the section (ZC+MAV) can be changed for Log(Len).

Finally, step 1052, Generation i+1, groups all the newly created and copies programs into a new population of unsorted programs 1054.

In either the preferred or the alternative embodiments, the final products of mode (a) are the M sensor site selections (827), the R feature selections used by the discriminating programs (828), and the software modules including the best of all the candidate discriminating programs developed during the evolution (822). This software module is ready to be embedded in the prosthesis and used for control. The best discriminating programs may or may not use all N channels and Q features (i.e., $M \leq N$ and $R \leq Q$). In step 832, the discriminating programs can simultaneously detect the presence of the motion command and the motion commanded. Or, they can be a set of programs used in stages to accomplish the same. For example, in one embodiment, a controller that must usdiscriminate six motions has six motion discriminating programs. Each of these discriminating programs focuses on detecting and identifying one of the six motions. These programs output a non-zero value proportional to the desired velocity of the motion when they detect their specific motion and output zero otherwise. In a variation on this embodiment, a separately-evolved program detects the presence of a motion command and activates a program or set of programs that determine which motion command it is.

(b) Controlling the prosthesis in realtime: After the invention adapts to the new user, the user controls his or her prosthesis in mode (b). During routine usage, the controller measures the M bioelectric channels (step 829) and then finds any motion commands and computes the R features required by the motion discriminating programs (step 832). The controller then uses the discriminating program(s) derived earlier to determine the type of motion being commanded in step 834. In the preferred embodiment, where there is a discriminating program for each motion, these programs can run one at a time in a single-processor implementation or simultaneously in a parallel-processor implementation. In a parallel-processor implementation, the discriminating programs send their output to a motion command supervisor which:

(1) breaks tie votes (in the case of mutually exclusive motions such as wrist flexion and wrist extension) by choosing the only motion possible from a given position if the prosthesis is in a position that limits choices (e.g., choosing wrist flexion if the wrist is already fully extended);

(2) breaks tie votes (in the case of non-mutually exclusive motions such as wrist flexion and wrist extension) by choosing the output of the discriminating function with the best evolution stage statistics (e.g. choosing wrist extension if the evolution data for wrist extension showed greater accuracy than that for wrist flexion); and (3) blends motion commands (in the case of non-exclusive motions such as wrist supination and wrist extension) into a coordinated motion.

In a single-processor implementation, the motion supervisor orders the execution of the motion discriminating programs depending on the current prosthesis position and the programs' evolutionary statistics to yield the most accurate motion decision in the shortest time. In either parallel or single processor implementations, the motion command supervisor then moves the prosthesis to carry out that motion decision (step 838).

(c) Refining the user adaptation: If the controller makes an error in motion selection, the user provides feedback about the error (e.g. by pushing a button dedicated for that purpose). The controller records this error feedback (step 850). After a certain number of errors are made, the controller will return to the evolution process and refine the discriminating program(s) to eliminate recurrences of these errors (step 844).

Mineral Identification

Figure 11:
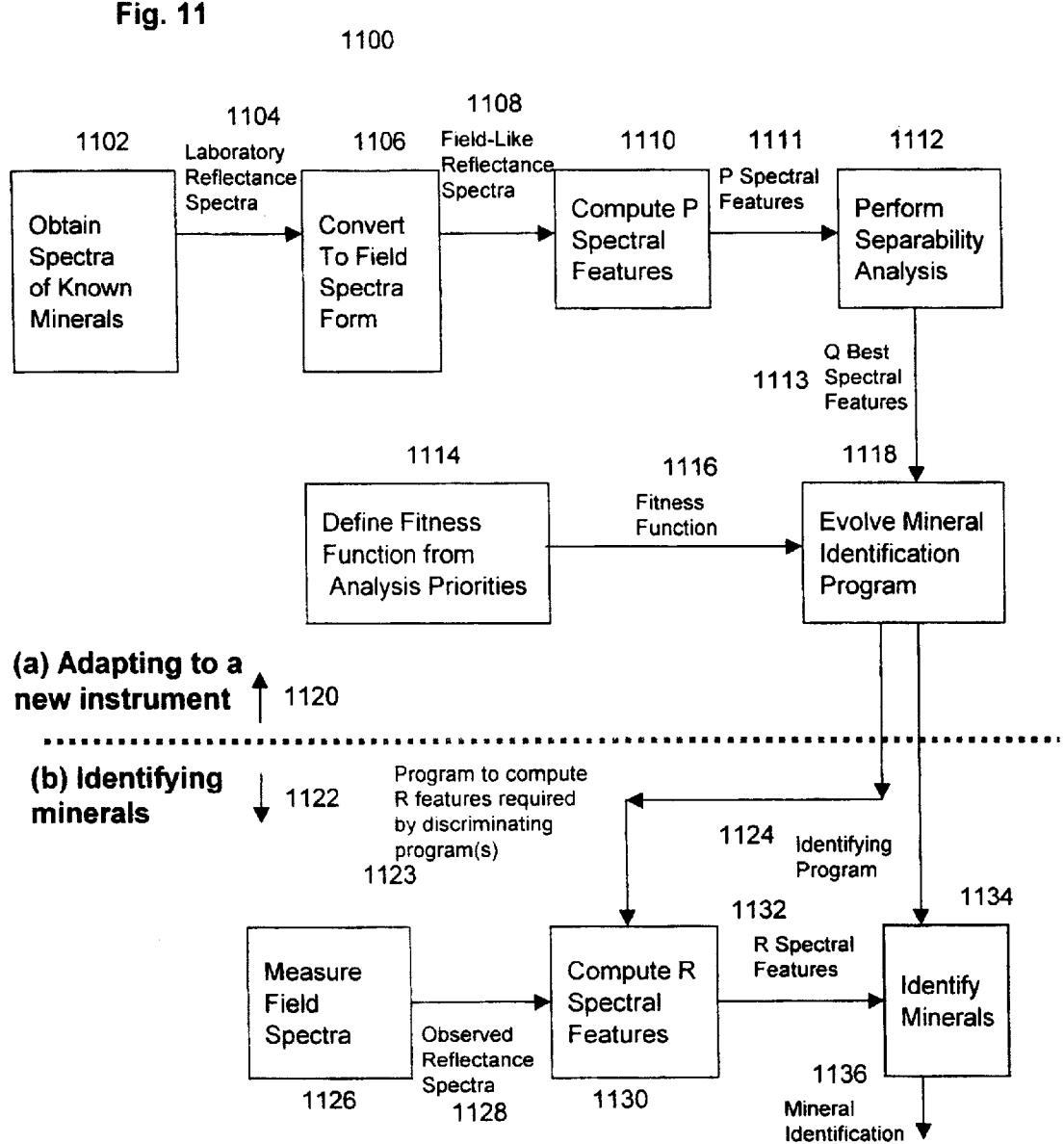
FIG. 11 is a flow diagram showing the operation of the evolver program taught by the present invention to produce a classifier program for the identification of minerals from their spectra.

FIG. 11 shows the invention's specific embodiment as a mineral identifier. In this embodiment, the invention uses reflectance spectrographs or other instrument data to discriminate between or identify minerals in rocks. This system can be used with any spectrograph or similar, with tailoring to the particular instrument. There are two modes of operation of the mineral identification embodiment: (a) Adapting to a new instrument and (b) Identifying minerals. The following paragraphs detail these modes.

(a) Adapting to a new instrument. Adapting the mineral identification embodiment to a specific instrument requires obtaining a set of instrument data recorded from known minerals (step 1102). Preferably, this data set should be recorded using the new instrument to record the data from the known mineral samples, measured under typical seeing conditions expected during routine use of the new instrument. If this is not possible, the identification embodiment can use any set of similar (e.g., spectra incorporating the wavelength range seen by a new spectrograph) data collected from known minerals in a laboratory. In the latter case, the embodiment converts the laboratory data sets into the form most likely to be encountered in field use of the new instrument (step 1106). In this specific embodiment for a spectrograph, the invention will alter the laboratory spectras wavelength range and convolve its resolution to match that of the instrument. It will also duplicate the spectra many times, then add different combinations of errors (e.g., instrumentation noise, background, and atmospheric effects that may exist in the field where the new instrument is to be used) to each copy. The result of step 1106 is a large database of spectra representative of those measured in the field.

In step 1110, if the spectra are small (e.g.. an eight-color survey), the invention does nothing. If the spectra are large, the system reduces each of them into P characteristic features, where P is less than the spectra's size. P depends on the sizes of the processors that evolve the identification programs and run the identification programs. The feature set may include, but is not limited to:

(1) Number and location of all minima (2) Number and location of all maxima (3) Number and location of all inflection points (4) Gaussian deconvolution characterization of absorption features (5) Coefficients of a hypothetical filter that could convert white light into the mineral's spectrum, the "Filter Analog" of the mineral All of these except the last (the filter analog) are common practice in analyzing reflectance spectra from minerals. The filter analog approach is unique to this mineral identification embodiment. One method of deriving the filter analog is to use the time domain version of the spectrum: convert the mineral's spectrum into an equivalent time series, then use time series parameter identification techniques to derive coefficients of the filter required to convert a white noise time series into the time series derived from the mineral's spectrum. The resulting filter coefficients are a reduced order representation of the mineral's spectrum.

After computing the complete spectral feature set for the known laboratory spectra set in step 1110, the identifier embodiment then performs a separability analysis on the features (step ???). This step selects the subset of Q ($Q \leq P$) features that will discriminate best between the minerals or mineral classes or other groupings desired. This separability analysis consists of:

(1) listing all possible pairs of minerals or mineral groupings that the identifier must discriminate between;

(2) computing, for each pair, a "normalized separation distance" equal to the difference between a each feature's averages for both divided by half the sum of the feature's standard deviations for both minerals;

(3) averaging the normalized separation distances across all pairs of minerals for a given feature;

(4) ranking the features by these pair-based average separation distances; and (5) choosing the Q features with the highest average separation distances, which will offer the best discrimination (and hence identification) performance.

In a variation on the embodiment, one can base the choices of the best N channels and Q features on averages of the normalized separation distances across features rather than across all mineral pairs. In another variation, one can use a technique other than normalized pair-wise separation distances to measure separability. In yet another variation on the embodiment, one can delete the separability analysis altogether, using all P features for the next stage (ie, set Q=P).

Step 1114 defines the fitness function, which reduces the identification priorities to a function that measures how well candidate mineral identification programs implement these priorities. In the embodiment, the fitness function measures the percentage of spectra correctly identified. Using the Q feature set (1112) and the fitness function (1116), step 1118 evolves the mineral identification programs. FIG. 9 details step 1118. The outputs of step 1118 are (1) a software module containing the best mineral identification program (s), ready to be embedded in the instrument and (2) a list of R features (where R≦Q) needed by the mineral identification program.

(b) Identifying Minerals.

After evolving the programs for a particular instrument's data collection capability and the field conditions under which it will be used, the identifier embodiment is ready to identify minerals. In field operations, the identifier commands the instrument to measure a mineral's spectra (step 1126). The identifier then computes the R spectral features needed by the mineral discriminating program(s) (step 1130). It then uses them in the discriminating program to identify the mineral (step 1134).

In step 1134, where there is a discriminating program for each mineral, these programs can run one at a time in a single-processor implementation or simultaneously in a parallel-processor implementation. In a parallel-processor implementation, the discriminating programs send their output to a mineral command supervisor which breaks tie votes by choosing the output of the discriminating program with the best evolution stage statistics (e.g., choosing a mineral if tests of its identifier program on a test portion of the evolution data sets showed greater accuracy than that of the competing mineral selection). In a single-processor implementation, the motion supervisor orders the execution of the mineral identification programs depending on the current prosthesis position and the programs' evolutionary statistics to yield the most accurate mineral decision in the shortest time. In either parallel or single processor implementations, the mineral identification supervisor then outputs the decision (step 1136).

Although the specific embodiments of the present invention are presented above to show best mode of operation and industrial applicability, the invention is broad and should not be limited to the specific embodiments. Even within the embodiments disclosed above it is possible to do many vary the specific uses and methods selected without departing from the invention. Some illustrative examples include:

1. Different types of functions, for example arctangent.
2. Different types of features, for example the maximum value of a signal or wavelet coefficients.
3. (Prosthesis) Different types of motions, for example individual finger motions, leg motions, hip motions, foot motions, or eye motions
4. (Prosthesis) Capability to control velocity, displacement, and duration of motions.
5. (Mineral) Capability to identify mineral classes and other useful groups such as hydrous silicates.
6. (mineral) Capability to identify mineral mixtures (including proportions) and grain sizes.
7. (mineral) Classify geological formations that indicate, but are not limited to the following: oil, natural gas, hydrocarbons, diamonds, and precious metals, such as gold, platinum and silver.
8. Myoelectric signal classification.
9. Neuroelectric signal classification.

As well it must be noted that the present invention has many potential uses, all of which are the invention. For example:

1. Powered Orthotics—Use the invention to identify the motion desires of the user, and then send that desire to the powered orthotic device.
2. Muscular and neural pathology diagnosis.—The invention can be used to classify muscular and neural patterns to diagnose myopathy and neuropathy. Present systems required a trained physician lo listen to a speaker to diagnose the condition of a patient. The present invention could be used to listen to the muscular or neural signal to classify the condition of the patient into several predefined categories
3. Bioelectric signal classification—Classification of signals generated from a living organism. For example, classification of heart murmurs.
4. Biometrics classification—The capability to classify different biometric properties. For example, a system that can classify fingerprints, retina scans, teeth imprints, facial features, or DNA samples.
5. Video Game Controller—The invention can be used to classify different motions to command a video game. These motions can then be used to send commands to the game computer to control the action of a game.
6. Motion analysis—The invention would analyze signals generated by placing sensors on the person or object doing a motion. A new motion can then be classified by comparing it to past known motions.
7. Motion Capture—The invention can be used to classify the motions of a person in order to capture or record their motions. These motions can then be used to control an animated character.
8. Virtual Reality—The invention can be used to classify the motion of a person to interact with a virtual world.
9. Chemical Compounds classification—A system that can recognize the spectra of different chemical compounds. For example a system that can identify the spectra of an ammonia molecule in a caustic media.
10. Speech Recognition—The invention can easily be modified to identify different speech patterns.

Type of signal generated: . . . Waveform from the speech, could be in individual words or in phrases.

Possible features: . . . frequency, pitch.
   Type of classifications possible: Each individual word. A phrase or a sentence.
11. Acoustic signal classification—The invention can be used to classify different acoustic signals into categories. For example a system can be developed to classify the engine size of a vehicle from its acoustic signature.
   Type of signal generated: . . . acoustic spectrograph, acoustic spectrum, acoustic theodolite (provides acoustical vertical profile of ocean currents), acoustic tomography, acoustic well logging,
   Possible features: . . . pitch, frequency, acoustic stiffness, acoustic stiffness reactance, velocity, refraction, mass, ohm
      Type of classifications possible: Characteristics of the material, characteristics of the room, acoustic shadow, and acoustic seal
12. Machinery Diagnosis Classifier.—A motor or engine produces a specific vibration when working right, and a different vibration or signal when malfunctioning
   Type of signal generated: . . . vibration spectrum, oscillations or sound
   Possible features: . . . vibrational energy, vibrational level, and vibrational quantum number
      Type of classifications possible: optimal performance, malfunction, and correct performance
13. Power plants signal classification—A system that can listen to the vibration or sound of a power plant. The invention can then make an analysis based on that vibration or sound. A special case of the Machinery Diagnosis Classifier.
14. Stock prices, commodities and futures price classification.—The invention can analyze at the history of the commodity using several factors, such as but not limited to: price, earnings, dividends, income, sales, profits, and debt. From these information it should be able to conclude a classification of future performance.
   A classification could be "strong buy", "buy", "hold", or "sell".
   Type of signal generated: . . . price history, profits history, earnings history
   Possible features: . . . earnings, dividends, income, sales, profits, debt, outlook.
      Type of classifications possible: strong buy, buy, hold, sell, strong sell
15. Color analysis classification.—The analysis of color is a complicated and profitable problem, it is used but not limited to the color classification of paints, clothing materials and papers. The invention can identify the spectra of different colors.
   Type of signal generated: . . . signal generated by spectrophotometry
   Possible features: . . . color index, color phase
      Type of classifications possible: different colors
16. Rotorcraft (Helicopters) instrumentation signal classification.—The invention can be used to classify rotorcraft noise abatement data.
   Type of signal generated: . . . noise generated during helicopter operations of fly-by, hover, landing and take-off phases.
   Possible features: . . . helicopter flight paths and operation conditions, such as the rotor tip speed and descent rate, as well as meteorological conditions.
      Type of classifications possible: Different flight operations
17. Radar/sonar signal classification—The invention can be used to look at the radar or sonar signature of a vehicle and make a classification of the type of vehicle.
   Type of signal generated: . . . radio frequency waveforms
   Possible features: . . . peak power, antenna gain, beam width, pulse length, pulse repetition frequency, wavelength, polarization, noise level of the receiver, radar frequency band
      Type of classifications possible: Identify different objects, radar reconnaissance.
18. Test for parameters of a moving vehicle, for example weight. When a vehicle passes through a check point sensors can be used to record information about the vehicle. This information can then be analyzed to determine the characteristics of the vehicle. A special case of the radar classifier.
19. Climatological classification
   Type of signal generated: . . . radar meteorological signals.
   Possible features: . . . orientation, coverage, intensity, tendency of intensity, height, movement, unique characteristics of echoes.
      Type of classifications possible: radar meteorological observation classification (hurricanes, tornadoes, or thunderstorms)
20. Food.—The aroma of food can be analyzed to determine the quality of the food. It could determine if the food has Totten or been contaminated. A special case of the chemical compound classifier.
21. Cloth quality classification.—The invention can be used to identify the spectra of different kinds of cloths to determine their quality.
   Type of signal generated: . . .
   Possible features: . . . thread count
      Type of classifications possible: radioactivity contamination.
22. Visual object classification—A video camera would take a digital picture of an object. The invention could then be used identify the object based on its digital signature.
   Type of signal generated: . . . Digital picture
   Possible features: . . . color, shape, size, and orientation
      Type of classifications possible: different types of objects
23. Data mining—A system that can look at large quantities of data and be able to classify the data into several categories. For example a system can be developed that looks at credit card patterns to determine if there is a possibility of fraud.
   Type of signal generated: . . . database of information, spending habits
   Possible features: . . . amounts, locations, items purchased
      Type of classifications possible: definite fraud, possible fraud, and no fraud
24. Magnetic signals.—The invention can be used to classify magnetic signals or signatures. This can be used to classify data from a magnetic resonance imaging apparatus.
   Type of signal generated: . . . nuclear magnetic resonance spectra
   Possible features: . . .
      Type of classifications possible: Different types of images
25. Infrared or Ultraviolet signal classification. This can be used for the classification of objects that invisible to humans, but visible under a different spectrum such as astrological observations.
   Type of signal generated: . . . astrological data
   Possible features: . . . intensity, frequency, and amplitude Type of classifications possible: classification of astrological observations, such as planets, white dwarf star, galaxies, or black holes.

26. Radio signal classification.—A system that can listen for patterns in a radio signal.

For example it can be used for radio climatology. Which is the study of the seasonal variation in the manner of propagation of radio energy through the atmosphere.

Type of signal generated: . . . radio signals

Possible features: . . . frequency, energy, and amplitude

Type of classifications possible: different climatological classifications

Thus the present invention should not be limited except by the following claims.

What is claimed is:

1. A method of evolving programs for processing an input signal having a plurality of features comprising:
   examining said features of said input signal;
   creating a classifier program responsive to said features;
   comparing the output of the classifier program to a desired output to produce a fitness function;
   creating a plurality of classifier programs; and
   optimizing the classifier program by using the fitness function to guide the evolution of the classifier program.

2. A method of evolving programs for processing signal from a domain comprising the steps of:
   selecting and actuating sensors appropriate for the domain;
   sensing the domain environment using the selected sensors to produce raw sensor data;
   acquiring and recording the raw sensor data;
   calculate single event data consisting of the raw signal data between the start and stop of a signal event;
   calculate a single event feature set that includes all features calculated for each sensor;
   add the single event feature set to the training database;
   add the classification for the single event feature set to the training database, which consists of records, each of which contains one event classification and the features associated with that event;
   calculate confidence by evaluating a classifier against the testing database and establishing its accuracy;
   resolve any unrecognized and misclassified signal event data to determine the proper classification;
   add the now-recognized signal event data to the training database for future refinement of the classifiers;
   randomly and evenly divide the training database into separate training and testing sets, such that
   1. each set contains events of all desired signal classifications
   2. each set contains adequate numbers of events for each desired signal classification
   3. the two sets are statistically equivalent and interchangeable;
   select values for items required for using genetic programming including initial fitness functions, population parameters, random seeds, genetic operators and termination criteria;
   run the genetic program until it finishes according to the termination criteria, then, record data, results and statistics about each run separately;
   determine if genetic program converged to acceptable solutions; and
   convert signal classifiers from genetic program form into one appropriate for evaluation/execution by the embedded domain classifier program.

3. A method of evolving programs to process at least one input signal comprising the steps of:
   generating a database of signals from said input signal channel;
   converting the signals in said input signal database to a form encountered in field use;
   calculating features from each signal in the converted signal database to characterizing the classification of said signals;
   producing at least one candidate classifying program responsive to said calculated features of said signals;
   producing a fitness function calculation program that calculates a value proportional to the signal classification success of candidate classifying program; and
   evolving the classification program using the fitness function to optomize the signal classifying program.

4. A method of evolving programs for processing a plurality of signal channels sensing the electric signals from a user's residual limb to control the user's prosthesis comprising the steps of:
   collecting signal data from a plurality of sensors on the user's residual limb while the user commands each desired motion a plurality of times to form a database of known motion commands associated with the electrical signals from the user's residual limb resulting from the motion command;
   reducing the plurality of electric signals in a time interval close to and including the motion command to a feature set;
   performing a separability analysis to choose a subset of signal channels and signal features that yields the best discrimination of the motion commands that the user generates;
   evolving a motion discriminating program using the subset of signal channels and features predicted to offer the best discrimination and a fitness function.

5. A method as in claim 4 wherein said seprability analysis comprises the steps of:
   this separability analysis consists of:
      listing all possible pairs of motions that the controller must discriminate between;
      computing, for each pair, a normalized separation distance equal to the difference between a each feature's averages on each channel for both members of the motion pair divided by half the sum of the feature's standard deviations on that channel;
      averaging the normalized separation distances across all pairs of motions for a given channel and feature; and
      ranking the channels and features by these pair-based average separation distances; and
      choosing the N channels and Q features with the highest average separation distances, which will offer the best discrimination performance.

6. A method as in claim 4 wherein the signal features consist of:
   (1) Mean absolute value (MAV)
   (2) MAV slope between time intervals;
   (3) Energy;
   (4) Rate of change of energy;
   (5) Average value;

(6) Number of zero crossings;
(7) Number of up slopes;
(8) Number of down slopes;
(9) Waveform complexity;
(10) Mean frequency;
(11) Median frequency;
(12) Energy or power at any frequency;
(13) Variance;
(14) Autoregressive or autoregressive moving average parameters; and ratios or other combinations of the above both within or between said channels and said time intervals.

7. A method as in claim 4 wherein the choices of the best channels and features are chosen on averages of the normalized separation distances across channels or features rather than across all motion pairs.

8. A method as in claim 4 wherein the separability analysis is omitted and all channels and features are used to predicted the best discrimination and a fitness function.

* * * * *